United States Patent [19]
Young et al.

[11] Patent Number: 5,113,548
[45] Date of Patent: May 19, 1992

[54] SURFACE SWEEPING MACHINE WITH OVER-THE-CAB HOPPER DUMPING

[75] Inventors: Gary B. Young, Waco; Albert L. Hanel, Eddy; Kenneth R. Veselka, Axtell, all of Tex.

[73] Assignee: Tymco, Inc., Waco, Tex.

[21] Appl. No.: 422,725

[22] Filed: Oct. 17, 1989

Related U.S. Application Data

[63] Continuation-in-part of Ser. No. 188,521, Apr. 29, 1988.

[51] Int. Cl.$^5$ .............................................. E01H 1/08
[52] U.S. Cl. .................................. 15/346; 15/340.1; 298/11; 298/14; 298/17.5; 298/23 MD; 414/471; 414/477; 414/546; 414/549
[58] Field of Search ............... 298/11, 12, 14, 17.5, 298/23 MD; 414/462, 471, 477, 546, 549, 718; 15/340.1, 346

[56] References Cited

U.S. PATENT DOCUMENTS

| | | | |
|---|---|---|---|
| 3,512,206 | 5/1970 | Young | 15/346 |
| 3,545,181 | 12/1970 | Young | 55/432 |
| 3,790,981 | 2/1974 | Young | 15/87 |
| 3,944,097 | 3/1976 | Savage | |
| 3,967,744 | 7/1976 | Goyarts | 414/728 X |
| 4,171,551 | 10/1979 | Hildebrand et al. | 15/84 |
| 4,178,647 | 12/1979 | Wolynec et al. | 15/84 |
| 4,222,141 | 9/1980 | Kieft et al. | 15/84 |
| 4,236,756 | 12/1980 | Hildebrand et al. | 298/11 |
| 4,274,788 | 6/1981 | Sutton | 414/559 X |
| 4,343,060 | 8/1982 | Hildebrand et al. | 15/84 |
| 4,568,239 | 2/1986 | Sims | 298/11 X |
| 4,660,248 | 4/1987 | Young | 15/340 |

*Primary Examiner*—Robert J. Spar
*Assistant Examiner*—Janice Krizek
*Attorney, Agent, or Firm*—Diller, Ramik & Wight

[57] ABSTRACT

A street sweeper which includes a frame, a hopper, a cab and a centrifugal separator on opposite sides of the hopper, a mechanism for moving the hopper from a position behind the cab to a position above and forward of the cab for dumping debris from the hopper, the hopper moving mechanism including a pair of first and second relatively extendable and retractable members, each of the first members being connected to the hopper and each of the second members being connected to the frame, a rotator carrying a slider, and a mechanism for pivoting each rotator which through its associated slider elevates the extendable and retractable members to permit movement of the hopper above and along the cab.

40 Claims, 17 Drawing Sheets

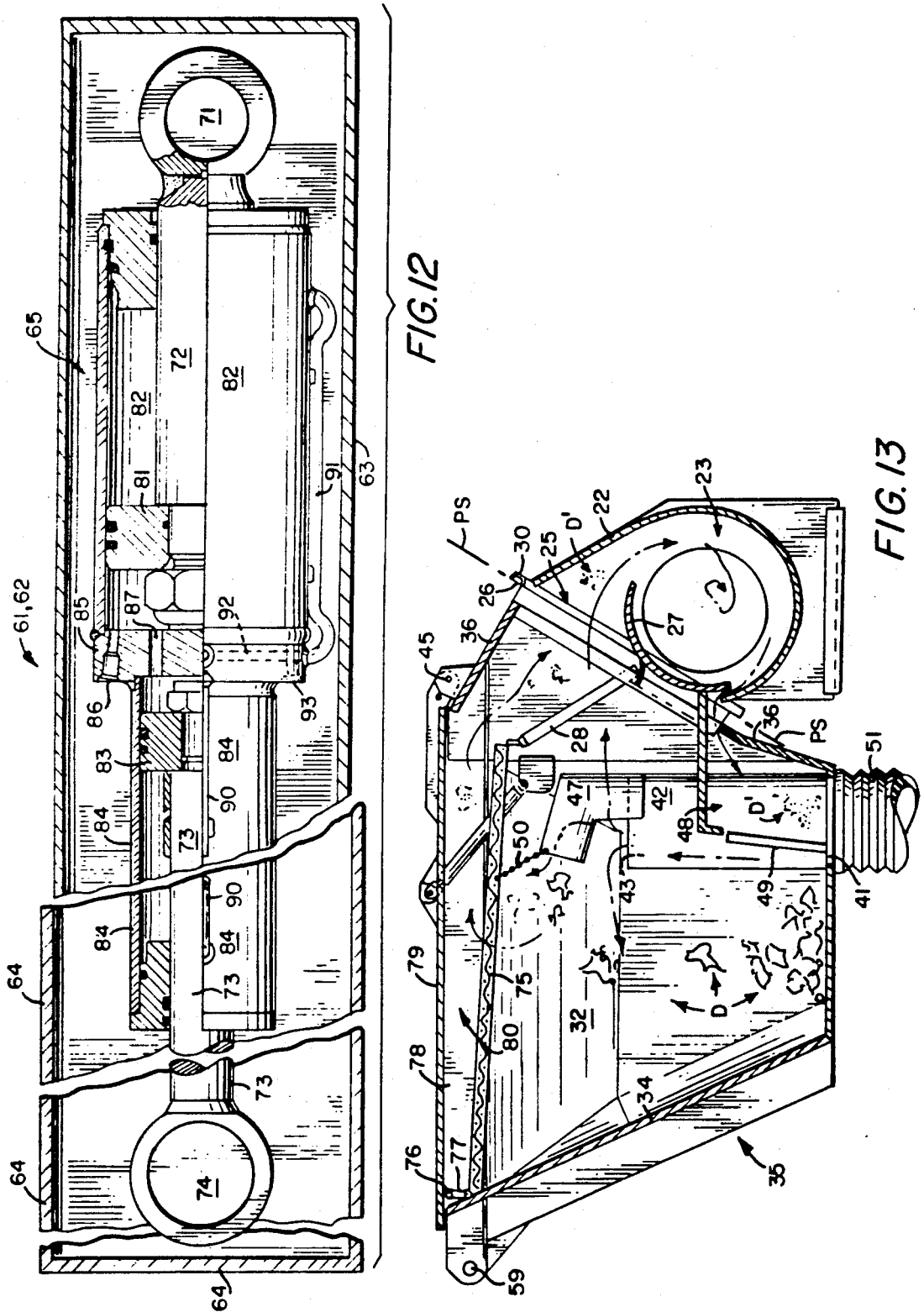

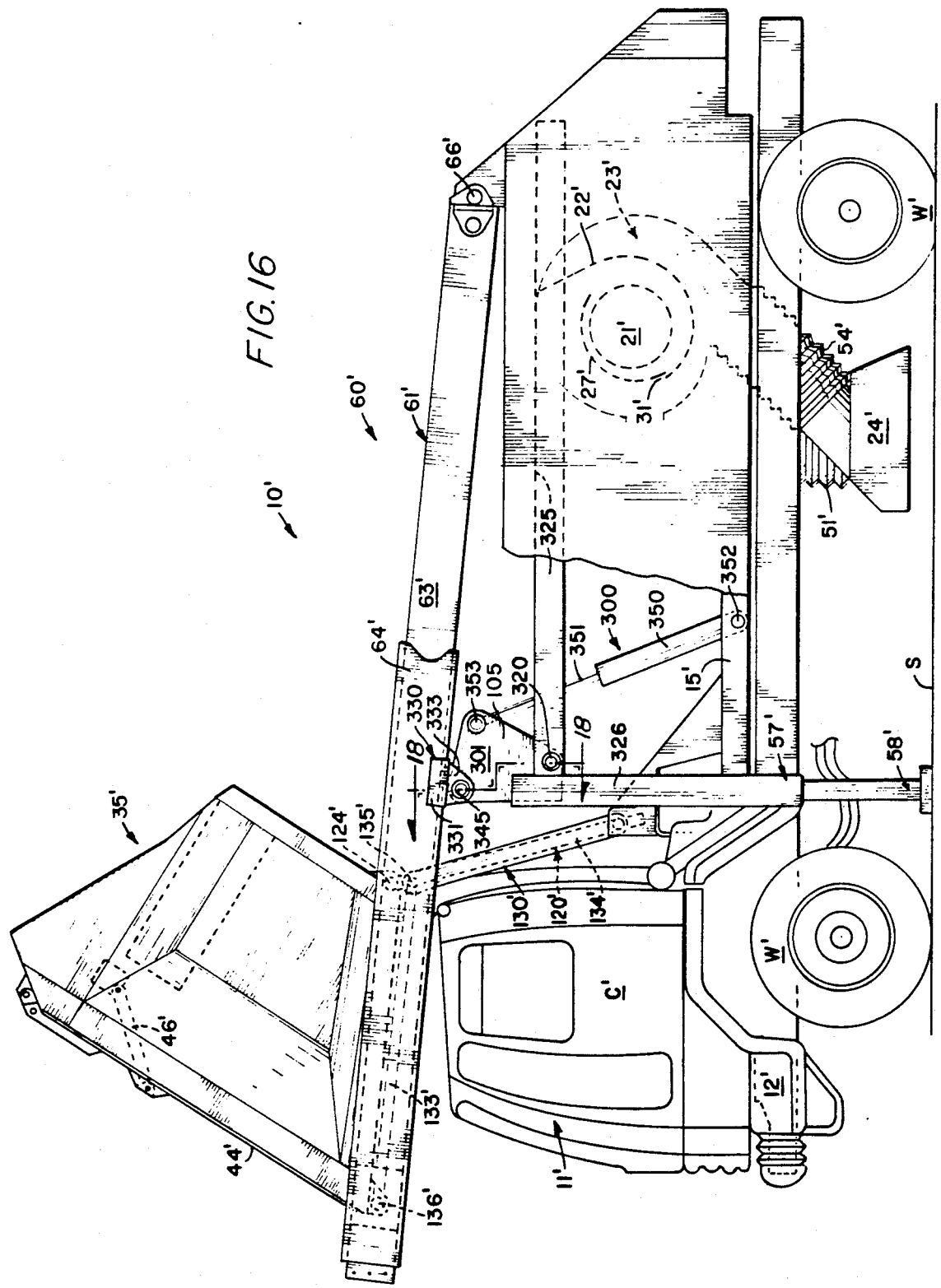

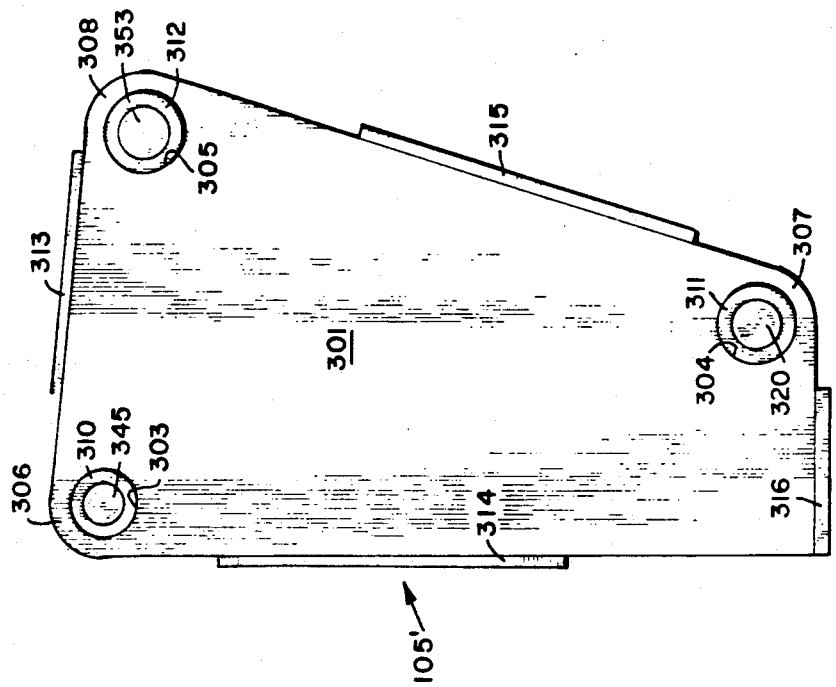
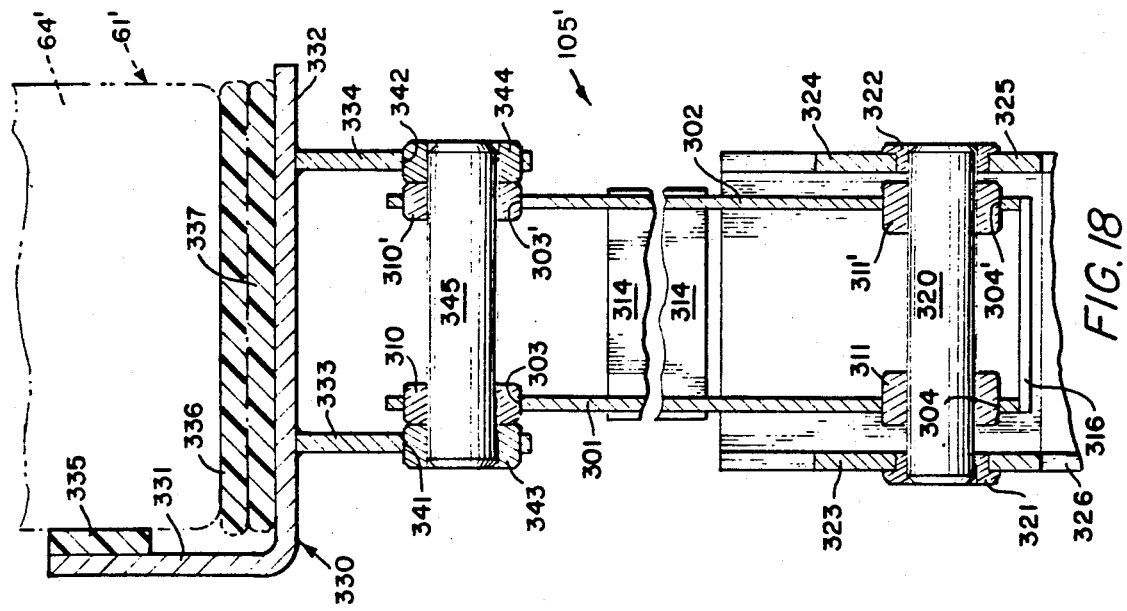

SURFACE SWEEPING MACHINE WITH OVER-THE-CAB HOPPER DUMPING

CROSS-REFERENCE TO RELATED APPLICATION

This application is a continuation-in-part application of commonly assigned U.S. Ser. No. 07/188,521 in the names of Gary B. Young, Albert L. Hanel and Kenneth R. Veselka filed on Apr. 29, 1988, entitled SURFACE SWEEPING MACHINE WITH OVER-THE-CAB HOPPER DUMPING.

BACKGROUND OF THE INVENTION

The present invention is directed to a surface sweeping machine, commonly referred to as a road sweeper, which utilizes gutter brushes and a pick-up head for delivering air-entrained debris into a hopper. The heavier debris falls to the bottom of the hopper and lighter dust enters a centrifugal separator which separates the dust from the air, delivers the dust to the hopper, and the cleaner air is recirculated along a generally continuous path of travel to the pick-up head and back to the hopper.

Typical road sweepers or street sweepers of the type aforesaid are disclosed in commonly assigned U.S. Pat. Nos. 3,512,206; 3,545,181; 3,790,981 and 4,660,248 issued respectively on Aug. 30, 1966; Aug. 30, 1966; Feb. 12, 1974 and Apr. 28, 1987. The totality of the disclosures of the latter-identified patents are incorporated hereat by reference, particularly in regard to details of construction, including, but not limited to, the gutter brushes, the pick-up head, the centrifugal separator, etc.

The street sweeper of U.S. Pat. Nos. 3,512,206 and 3,545,181 is quite typical in its construction and includes a conventional vehicle or truck having a frame, a cab, an auxiliary engine behind the cab for driving a turbine of the centrifugal separator, a continuous closed path air circulating system, and a hopper at the rear end of the frame having an outlet normally closed by a door. When the hopper is filled with debris, the street sweeper is driven to a dump site, the hopper door is then opened to discharge the debris, and the hopper is tilted or pivoted to augment the discharge of the debris through the now opened hopper door. Such conventional rear-dumping hoppers are well known but have obvious draw-backs, particularly associated with rearward visibility as, for example, when the street sweeper is backed into the dump site area.

Disadvantages of such rear-dumping vehicles are acknowledged and set forth in U.S. Pat. Nos. 4,236,756; 4,171,551; 4,178,647; 4,222,141 and 4,343,060 issued respectively on Dec. 2, 1980; Oct. 23, 1979; Dec. 18, 1979; Sept. 16, 1980 and Aug. 10, 1982 in the names of Donald L. Hildebrand et al., particularly with respect to the disadvantages of rearward visibility and the acknowledged advantages of forward visibility associated with forward dumping, high dumping or over-the-cab dumping of hoppers associated with street sweepers. The subject matter of the latter patents was commercially manufactured by the common assignee for several years, but is no longer being manufactured thereby. However, high dump or forward-dumping of street sweepers hoppers remains viable, particularly when, as in the present case, it is intended that the hopper be dumped into a dump truck or like vehicle. Thus, with the high dump street sweeper of the present invention it is unnecessary to back the street sweeper toward the vehicle into which the debris of the hopper is to be dumped, and instead the street sweeper is simply driven adjacent the dump truck and the debris from the street sweeper hopper is dumped forwardly over-the-cab with the attendant desirable forward visibility heretofore noted.

SUMMARY OF THE INVENTION

In keeping with the present invention, a novel surface sweeping machine with an over-the-cab dumping hopper is provided and includes a conventional vehicle frame and its associated engine, cab, wheels, etc. The cab is located at a forward end portion of the frame and a conventional centrifugal separator, as specifically disclosed in U.S. Pat. Nos. 3,545,181 and 3,512,206 is located at a rear end portion of the frame. The centrifugal separator is part of a continuous recirculating closed path of travel for air which includes a pick-up head transversely spanning the vehicle frame. Air-entrained debris exits the pick-up head and enters an associated hopper which in a first position is located between the cab and the centrifugal separator. Heavier debris accumulates in the hopper while lighter debris and dust entrained in the air exits the hopper and enters the centrifugal separator. The centrifugal separator separates the lighter debris and the dust, discharges the latter into the hopper, and the cleaner air exits the centrifugal separator and is delivered to an inlet of the pick-up head for continuous circulation.

Two pairs of relatively extendable and retractable first and second members are carried by the vehicle in generally parallel relationship to each other. A first of the members of each pair is pivotally connected to the hopper and an opposite end of the second member of each pair is pivotally connected to the frame. A rigid control arm is articulately connected to each first member, and is also pivotally connected to the frame. In one embodiment of the invention each control arm is a rigid fixedlength link pivoted to an associated first member and in a second embodiment of the invention each control arm is a rigid fixedlength link pivoted to a shoe which is in turn in sliding relationship with an associated first member. Associated hydraulic cylinders are operative through an appropriate hydraulic circuit to selectively extend and retract the first and second members of both pairs such that the hopper is moved from its first position behind the cab and adjcent the centrifugal separator along a compound path of travel which proceeds forwardly and upwardly as the control arms pivot and the first and second members extend until the hopper reaches a second position generally overlying the cab. Thereafter an associated hopper door is opened and the hopper is tilted to effect over-the-cab dumping. The return cycle is initiated by the hopper tilting back to its original position followed by the closing of the hopper dump door. Thereafter, retraction of the first and second members results in the hopper returning along the same compound path of travel, but in the opposite direction, from the second or dumping position to the first or travel position adjacent the centrifugal separator.

A dumping cylinder is also pivotally connected to the frame and to the hopper to guide the hopper over the cab and additionally provide pivotal dumping movement to the hopper only after the hopper is in a predumping position thereof.

A major safety feature of the over-the-cab dumping road sweeper is the provision of an occupant protection system which assures that the hopper can not descend from its second/dumping position accidentally or inadvertently due to mechanical or hydraulic failure and, thus, there is avoided damage to the cab and/or injury to any occupant therein. The occupant protection system includes two pair of links with the links of each pair pivotally connected to each other. One of the links of each pair is also pivoted to one of the extendable and retractable members which in the extended position projects over the cab, and the other link of each pair is pivotally connected to the sweeper frame adjacent and to the rear of the cab. When the hopper rests upon the frame in its first position, the two pairs of links are folded compactly in an area between the hopper and the cab, but as the hopper is moved along the compound path of travel towards its dumping position, the two links of each pair progressively pivot relative to each other until a first link of each pair is positioned between the cab and the hopper when the hopper is in its second or dumping position. If the hopper should, for any reason, tend to move toward the cab, as, for example, due to failure of the dumping cylinder or the hydraulics associated therewith, the hopper would contact these first links and the latter would prevent the hopper from continuing toward and into potentially damaging contact with the vehicle cab and any occupants therein.

The novel over-the-cab dumping sweeper also includes a novel hopper which includes a flexible deflector above an inlet pipe which is automatically flexed or deflected by high speed inlet air. In addition, the flexible deflection is also automatically flexed when the hopper door is opened during a dumping cycle to remove debris which may have accumulated upon the deflector during a sweeping cycle. The novel hopper also includes a cleaning chamber defined between an outermost wall of the hopper door and a screen inboard thereof into which water from a nozzle can be directed through forward/downward facing openings when the hopper is in its second/dumping position, and the dumping door is opened to remove debris from the underside of the screen and/or the interior of the chamber.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 12 is a cross-sectional view taken generally along line 12—12 of FIG. 1, and illustrates a double acting piston for operating the extendable and retractable members.

FIG. 13 is a longitudinal sectional view taken through the hopper and the centrifugal separator, and particularly illustrates the manner in which air-entrained dust enters the centrifugal separator and dust exits the centrifugal separator and enters the hopper.

FIG. 16 is a schematic side elevational view of the over-the-cab street sweeper, and illustrates the over-the-cab predumping/dumping position of the hopper in which the control arm has pivoted from the horizontal position of FIG. 15 to a vertical position at which the associated retractable members are elevated to permit extension and retraction thereof above the cab.

FIG. 17 is an enlarged side elevational view of the control arm of FIG. 16, and illustrates the generally trapezoidal configuration thereof and a plurality of pivot pins.

FIG. 18 is an enlarged cross-sectional view taken generally along line 18—18 of FIG. 16, and illustrates structural details of the control arm and a slide shoe pivotally connected thereto.

DESCRIPTION OF THE PREFERRED EMBODIMENT

Figure 1:
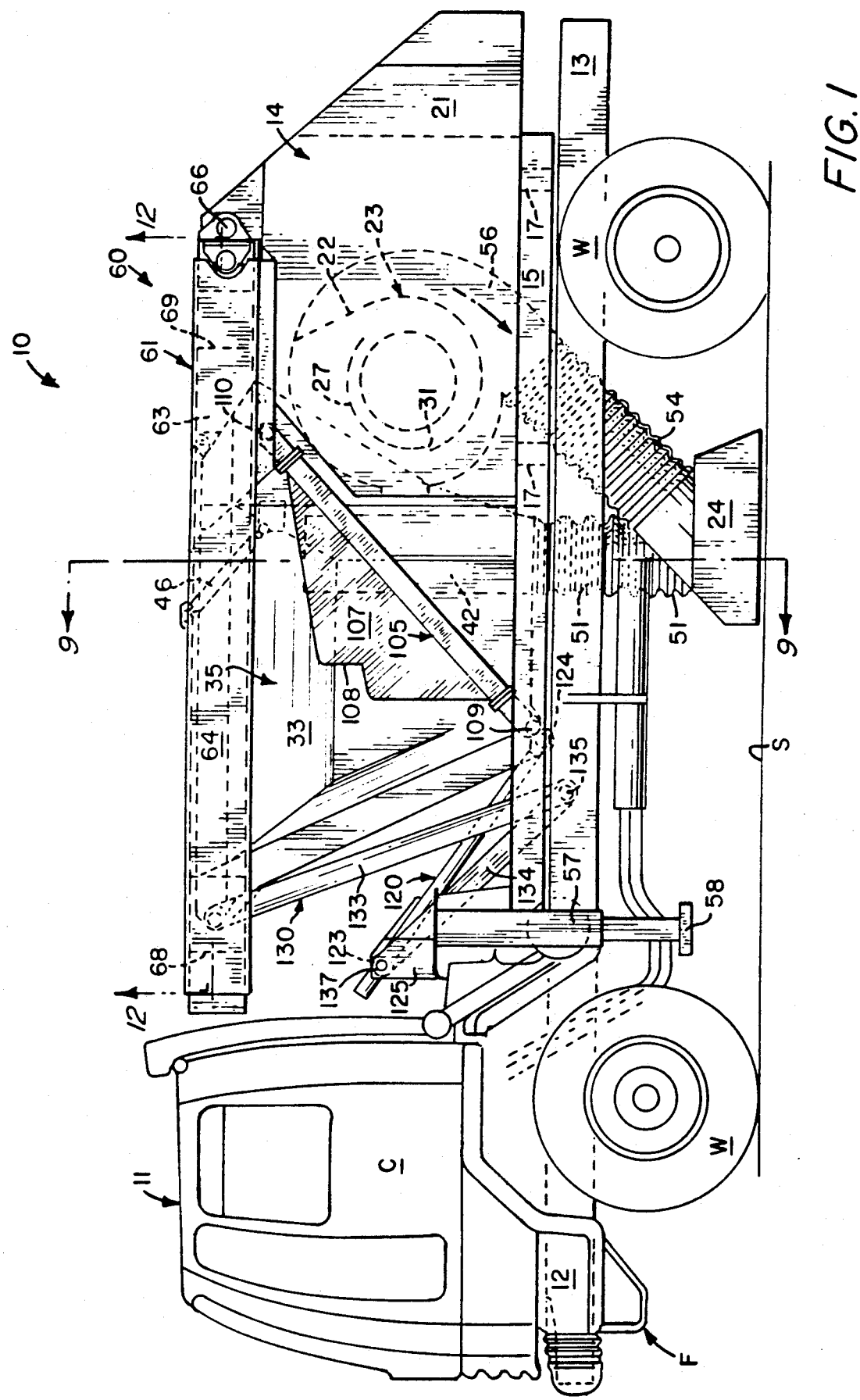
FIG. 1 is a schematic side elevational view of the over-the-cab hopper dumping street sweeper of this invention, and illustrates a hopper located between a cab of the vehicle and a centrifugal separator, one of a pair of relatively extendable and retractable first and second members pivotally connected to the hopper and to the vehicle frame, a control arm pivoted to the frame and one of the members, a hopper dumping cylinder pivotally connected between the hopper and the frame, and a pair of pivotally connected links defining an occupant-protecting system.
Figure 2:
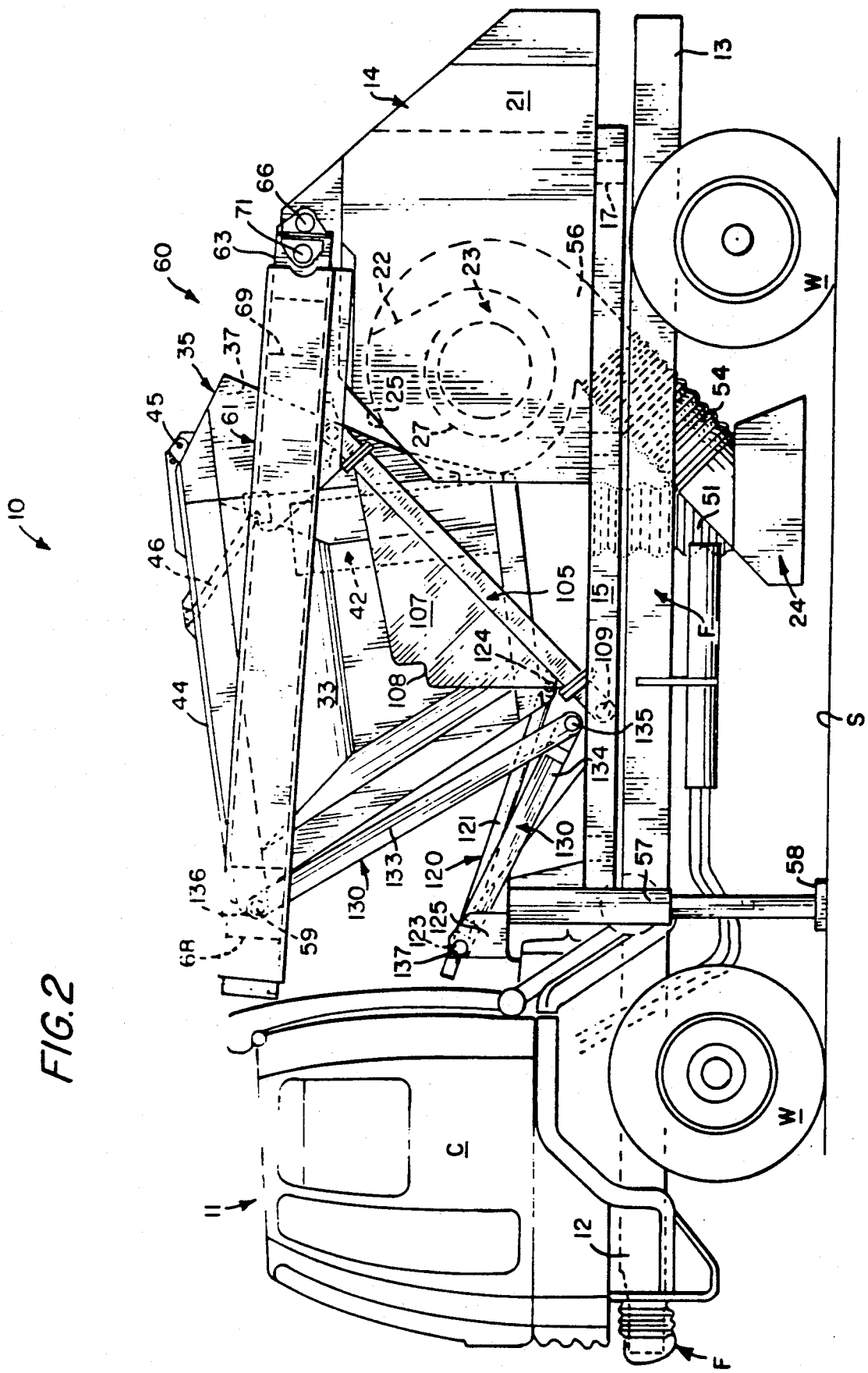
FIG. 2 is a schematic side elevational view of the street or road sweeper of FIG. 1, and illustrates relative positions of the various components during initial movement of the hopper from its nondumping or travel position of FIG. 1 toward its dumping position of FIG. 8.
Figure 3:
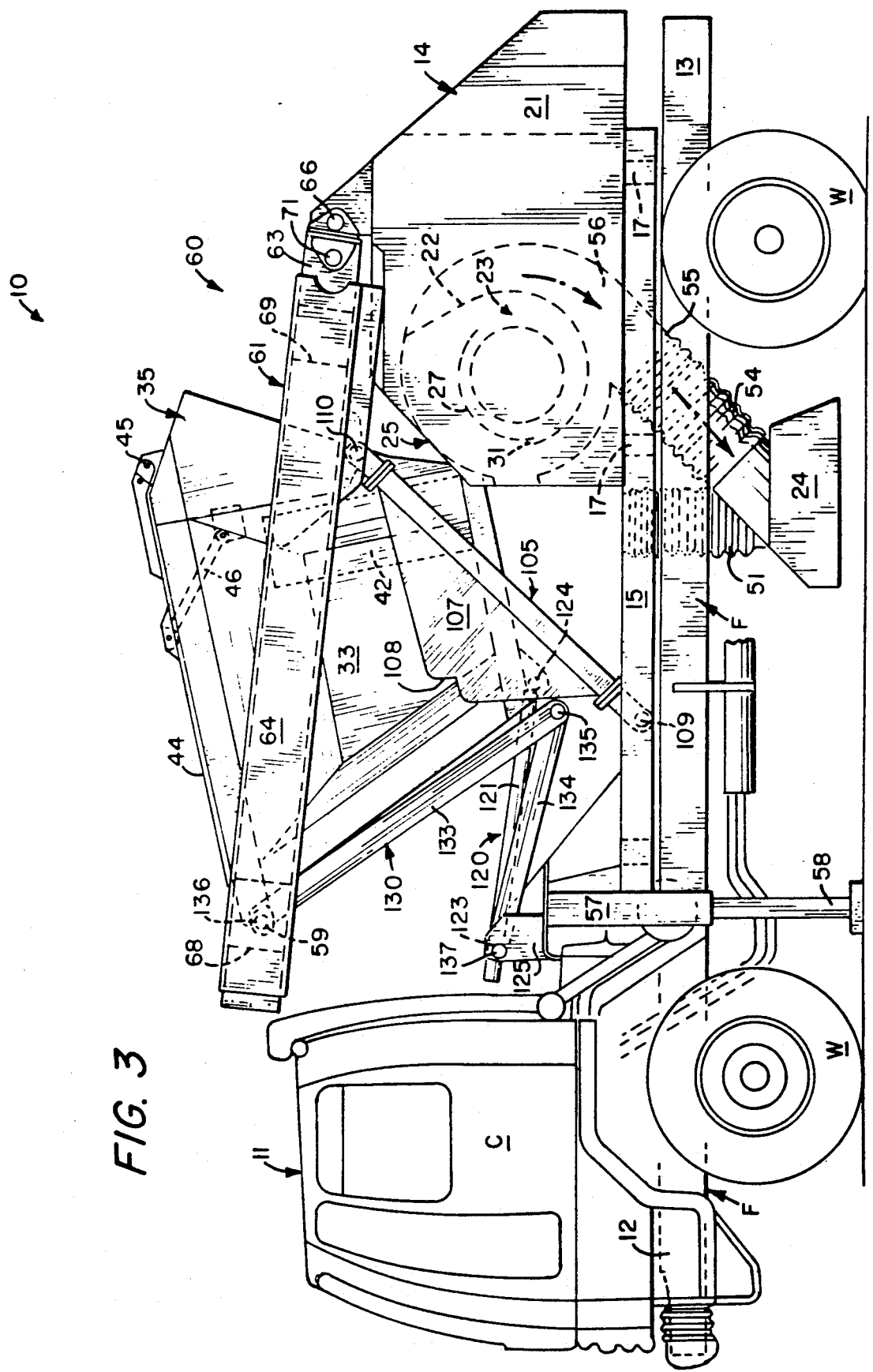
FIGS. 3 through 7 are schematic side elevational views of the street sweeper, and illustrate the progressive relative movement and positions of the various components to move the hopper from its first or non-dumping position of FIG. 1 generally along a compound path of travel moving from right-to-left and upwardly along the longitudinal axis of the vehicle until reaching the over-the-cab or pre-dumping position of FIG. 7 with one of the links of each pair of links of the occupant protection system being protectively disposed between the hopper and the cab.
Figure 4:
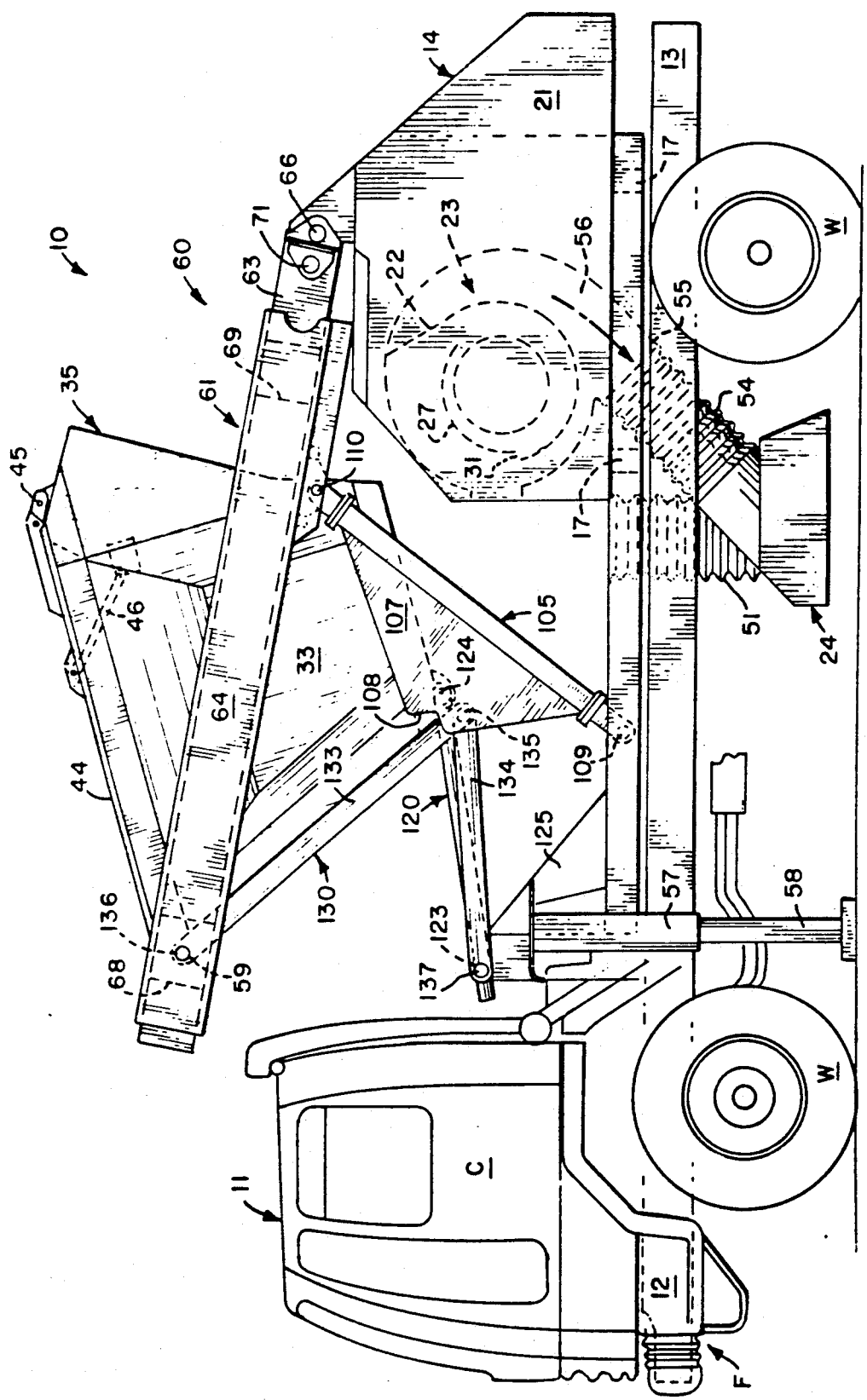
Figure 5:
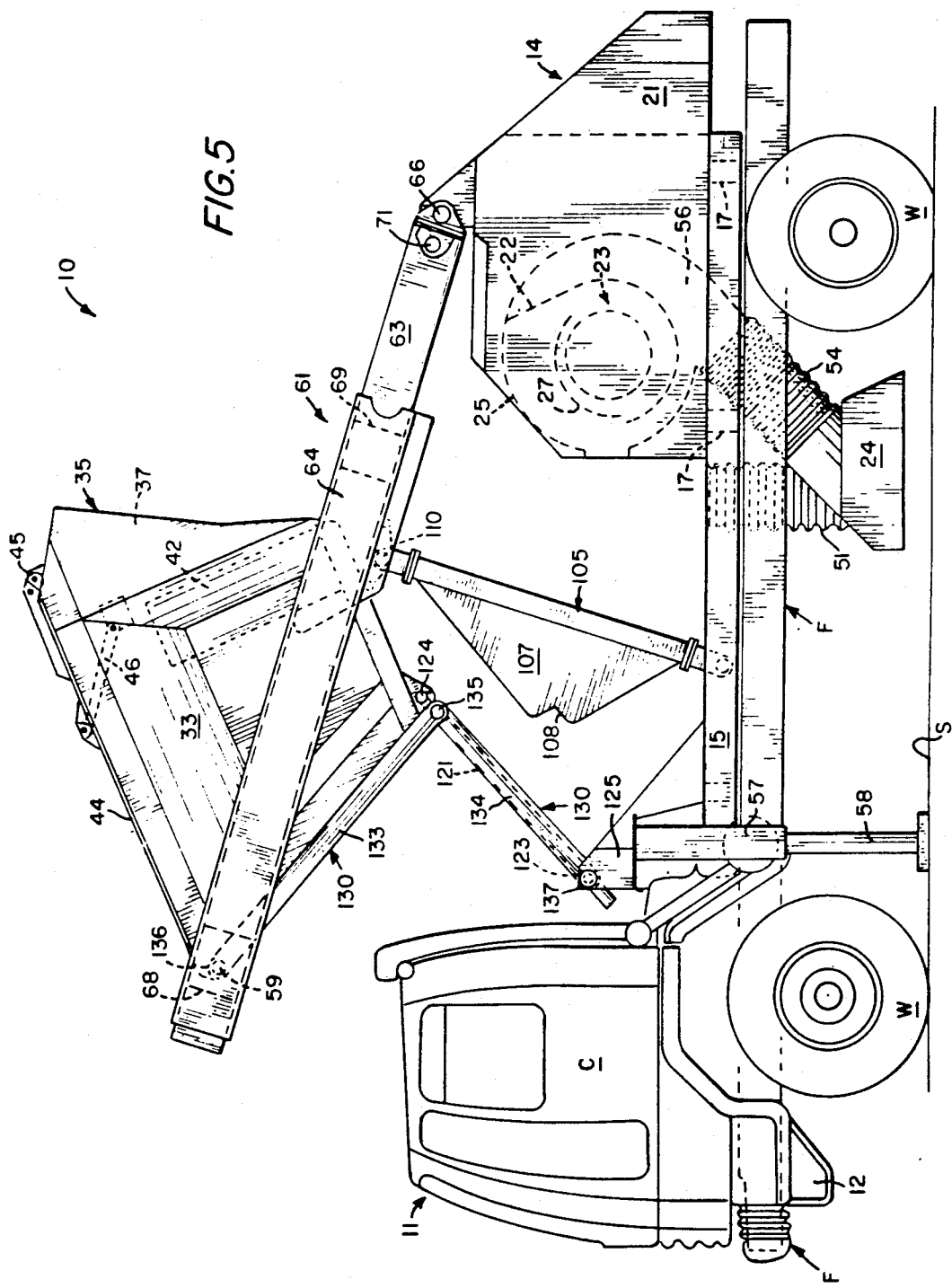

A novel high-dump or over-the-cab road sweeper, street sweeper or sweeping machine is generally designated by the reference numeral 10 and includes a conventional vehicle 11 having a frame F, an occupant cab C at a front end or front end portion 12 of the frame F, a rear end or rear end portion 13, and wheels W appropriately conventionally suspended from the frame F. The vehicle 11 includes an engine (not shown), transmission (also not shown) etc., all provided by the manufacturer which may be, for example, Ford Motor Company, General Motors Corporation, or the like.

A sweeper frame 14 (FIGS. 1 through 10) is rigidly secured to the vehicle frame F and includes generally parallel spaced apart side frame members 15, 16 (FIGS. 1 through 11) and a plurality of transverse cross-frame members 17 connected therebetween. A pair of upstanding generally parallel spaced side walls 20, 21 (FIG. 11) are secured to the frame members 16, 15, respectively, and situated therebetween is a housing 22 of conventional centrifugal separator means 23 (FIG. 13) in the form of a centrifugal separator of the type disclosed in U.S. Pat. Nos. 3,545,181; 3,512,206 and 4,660,248 having a blower 19 including a turbine (not shown) driven by a conventional auxiliary engine (not shown) supported upon the sweeper frame 14 rearward of the housing 22. In addition to separating dust from air, the centrifugal separator 23 also establishes a continuous closed path of travel for air into, along and out of a conventional pick-up head 24 of the type disclosed in the latter-noted patents. The housing 22 of the centrifugal separator 23 includes a generally rectangular inlet opening 25 which carries a seal 26. A generally curved or arcuate inlet plate 27 (FIGS. 1 and 13) extends across the rectangular inlet opening 25 and separates the opening 25 into an upper inlet opening 30 and a lower dust discharge opening 31 which will be described more fully hereinafter.

A hopper 35 is illustrated in FIG. 1 in its nondumping, travel or first position. The hopper 35 is generally a hollow receptacle defined by a bottom wall 29 (FIGS. 9 and 10), side walls 32, 33, a front or forward wall 34 and a rear wall 36 which includes therein a generally rectangular outlet opening 37 (FIG. 10) which corresponds in size and shape to the rectangular opening 25 (FIG. 11) of the centrifugal separator housing 22. With the hopper 35 in its nondumping or travel position (FIG. 1) a rectangular peripheral edge portion 40 (FIG. 10) immediately adjacent the opening 37 rests against and forms a hermetic seal with the seal 26 (FIG. 11) of the centrifugal separator housing 22. A plane Ps (FIG. 13) defines an angle of approximately 60° with the horizontal and defines the plane of sealing between the rectangular peripheral portion 40 (FIG. 10) of the hopper rear wall 36 and the seal 26 (FIGS. 11 and 13) of the centrifugal separator housing 22. An opening 41 (FIGS. 10 and 13) is formed in the bottom wall 29 of the hopper 35 and rising therefrom interiorly of the hopper 35 is an inlet tube 42 having an uppermost inlet opening 43 spaced below a hopper door 44 (FIG. 13) which is pivoted at 45. The door 44 can be opened and closed selectively by fluid cylinders 46 at opposite sides thereof which are pivotally connected to the door 44 and to each of the side walls 32, 33. A flexible deflector 47 is connected to the inlet tube 42 adjacent the inlet opening 43 thereof, and as debris-entrained air flows upwardly in the tube 42, it is directed forwardly and generally downwardly by the flexible deflector 47. Heavier debris D will drop to and accumulate upon the bottom wall 29 of the hopper 35, while air entrained dust will be drawn through rectangular screens 28, 75 through the hopper outlet 37 and into the inlet opening 30 of the housing 22 into the centrifugal separator 23 as is indicated by the unnumbered headed arrows shown in FIG. 13. The screen 75 is carried by the door 44 in spaced relationship to a top panel 79. A front wall 76 spans the distance between the wall 79 and the screen 75 and has a plurality of openings 77 which run the length of the wall 76 between opposite side walls 78 depending downwardly from the top panel 79. In this manner the top panel 79, the screen 75, the front wall 76 and the two depending side walls or panels 78 define a chamber 80 of the door 44. Some of the heavier debris D will strike the underside and adhere to the screen 75 and other debris may lodge in the chamber 80. However, due to the holes or openings 77, when the door 44 is opened, a high velocity stream of water from a hose can be directed into the chamber 80 through the opening 77 to cleanse the chamber 80 of any debris and, as the water impinges against the screen 75 from the chamber side, any debris on the inside of the screen 75 will be flushed/rinsed therefrom.

A flexible link 50 is connected between the flexible deflector 47 and the screen 75 of the door 44 of the hopper 35. When the street sweeper 10 is cleaning debris from the surface S through the pick-up head 24 (FIG. 1) the high speed air exiting the inlet tube 42 automatically vibrates or flexes the deflector 47 to shake any debris D tending to adhere thereto. Additionally, as will be apparent more fully hereinafter, when the hopper door 44 is opened (FIG. 8) by the fluid cylinders 46, the link 50 will flex, deflect or shake the flexible deflector 47 and thereby rid it of any debris which may have accumulated thereupon. This results in self-cleaning of the flexible deflector 47 of accumulated debris each time the hopper door 44 is opened and closed during a dumping cycle.

The hopper opening 41 in the bottom wall 29 forms a seal with a like opening of a flexible conduit or pipe 51 (FIGS. 9 and 13) which is in turn connected to an outlet opening 52 of the pick-up head 24. An inlet opening 53 of the pick-up head 24 is connected to a like flexible conduit or tube 54 which is in turn connected by a fitting 55 to the blower housing outlet by an air outlet 56 of the blower 19.

From the foregoing, as the auxiliary engine operates to drive the turbine (not shown) associated with the centrifugal separator 23, the generally continuous closed air flow path for picking up debris from an associated road or like surface S is established and is generally defined by air exiting the axial air outlet 56 (FIG. 1) of the centrifugal separator 23, entering the fitting 55, flowing through the tube 54 into the inlet opening 53 of the pick-up head 24, traveling along the pick-up head 24 to entrain debris therewith, the air-entrained debris exiting the pick-up head 24 through the outlet opening 52, flowing upwardly through the tube 51 (FIGS. 9 and 13), entering the hopper opening 41, flowing upwardly through the hopper inlet tube 42 (FIGS. 9 and 13), and exiting the opening 43 thereof with its direction being influenced by the flexible deflector 47, as indicated by the unnumbered headed arrows in FIG. 13. Heavier debris D falls and lighter debris and dust-entrained air exits the rectangular screen 28 and hopper opening 37 and enters the inlet opening 30 of the centrifugal separator housing 22. Cleaner air then exits the axial air outlet 56 of the centrifugal separator 23 to complete the closed continuous flow path. Lighter dust and dirt D' (FIG. 13) are centrifugally separated in the centrifugal separator 23 and exit therefrom through the dust discharge opening 31 which directs the dust into a skimmer chamber 48 of the hopper 35 which has a hinged door 49 which automatically pivots open during hopper dumping to discharge the dust therefrom.

The sweeper 10 may, of course, include gutter brooms at either or both sides in the manner disclosed in U.S. Pat. No. 3,790,981 to direct debris which is laterally outboard of the pick-up head 24 adjacent curbs or gutters toward the pick-up head 24 for eventual deposit into the hopper 35.

Figure 6:
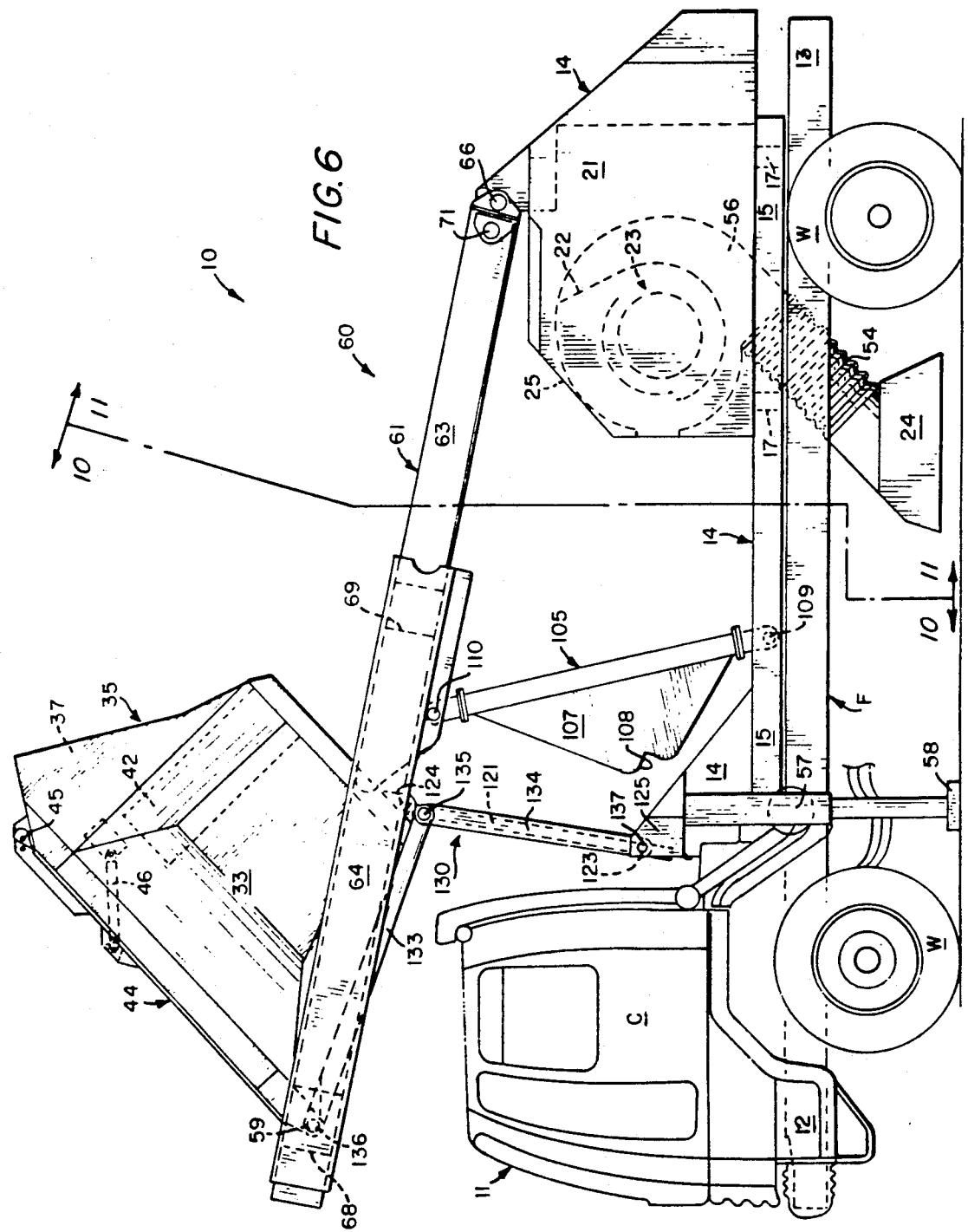
Figure 7:
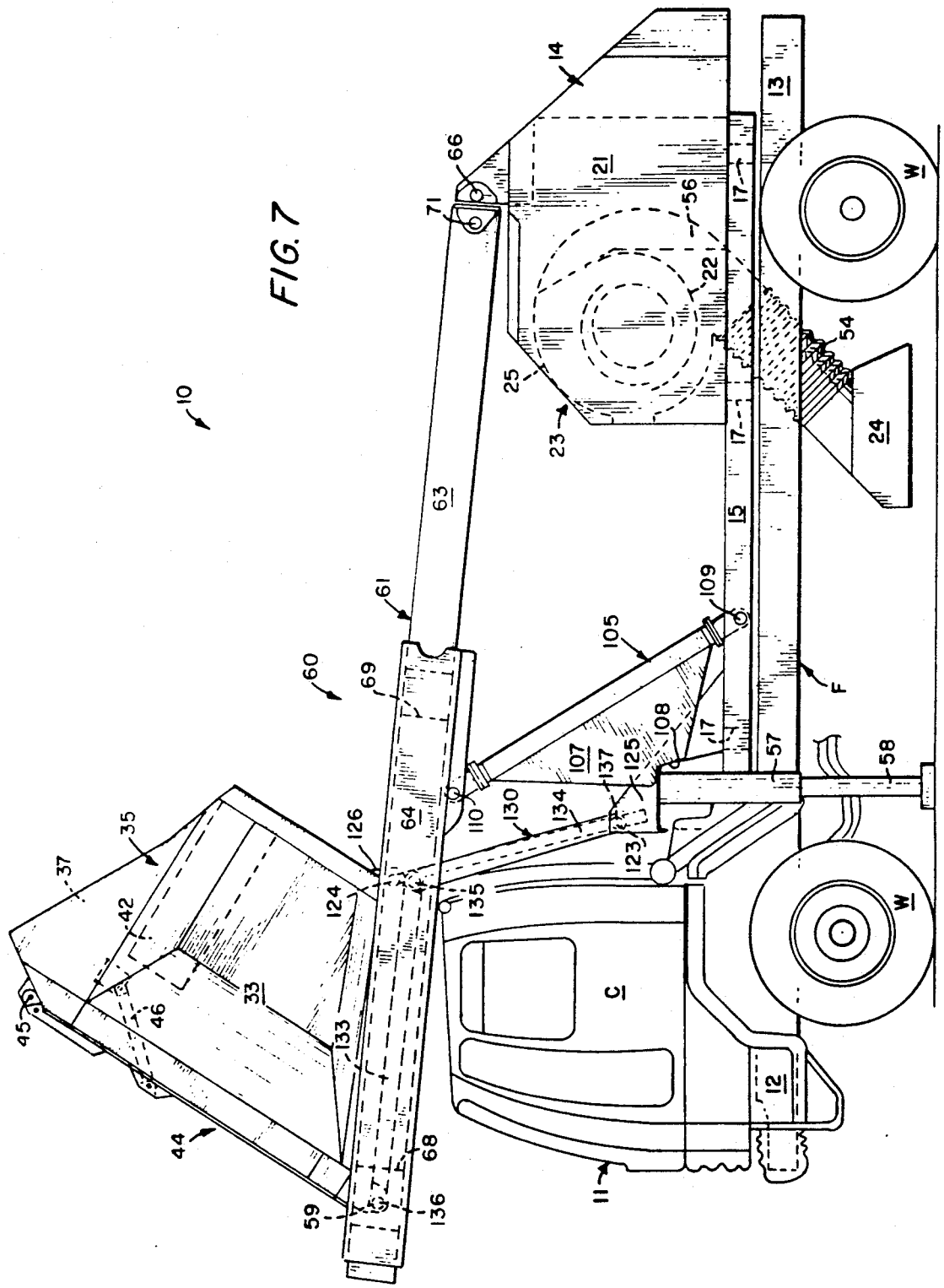
Figure 8:
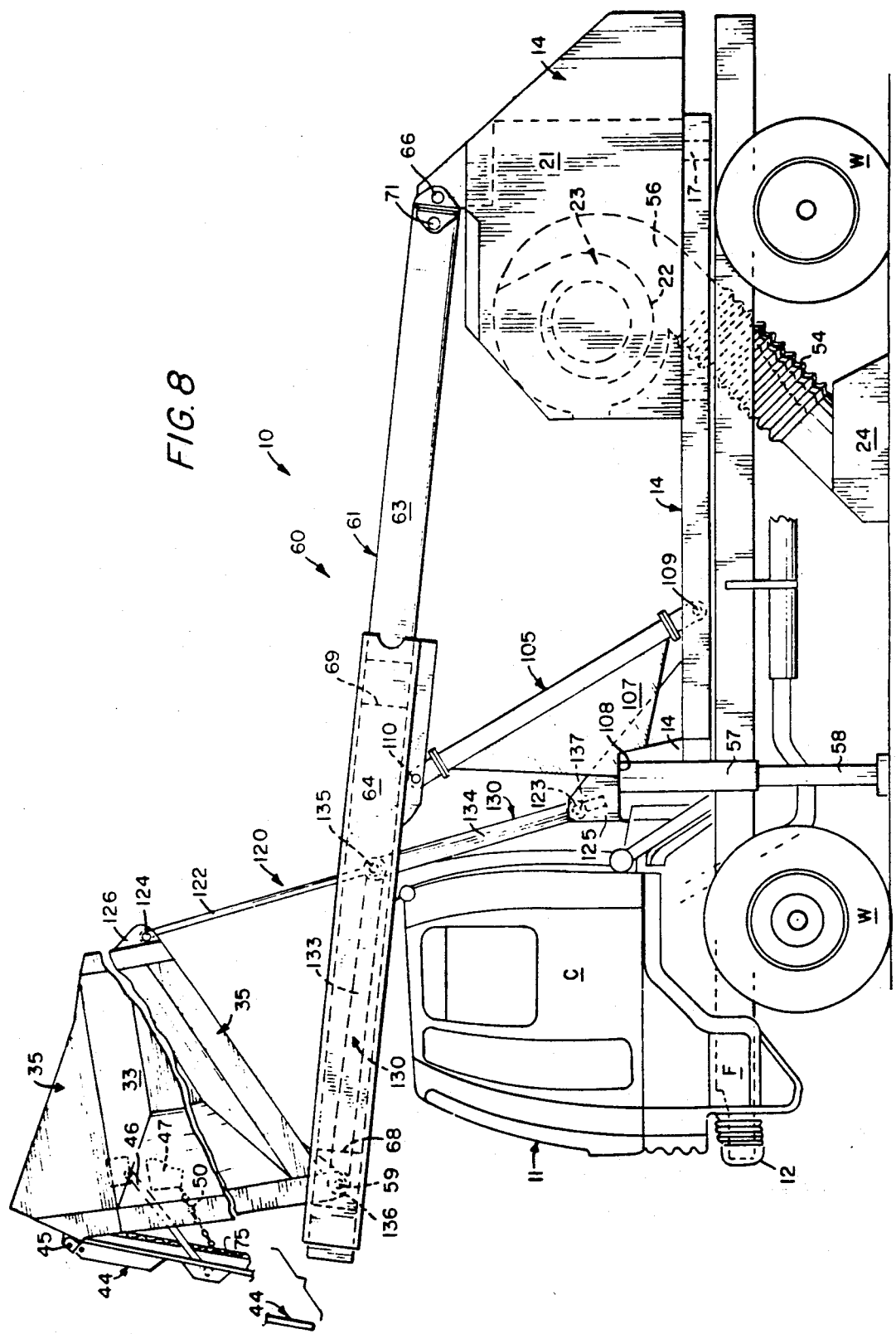
FIG. 8 is a schematic side elevational view of the over-the-cab or high dump street sweeper, and illustrates the hopper in its final dumping position with the hopper dumping cylinder extended just after the opening of the hopper dumping door to discharge debris from the hopper.

A lateral stabilizer 57 in the form of a fluid cylinder carrying a foot 58 is carried by the frame F behind the cab C at each side of the vehicle 11. The feet 58 of the stabilizer 57 are above the surface or ground S during travel of the sweeper 10 but are extended downwardly into contact with the ground or surface S to support the frame F without overloading the suspension system (not shown) of the vehicle 11 when the hopper 35 is being dumped and/or moved toward its dumping position, as will be described more fully hereinafter (FIGS. 2 through 8). Preferably, the feet 58 are brought into contact with the ground or surface S prior to initiating movement of the hopper 35 from its nondumping or travel position (FIG. 1) toward its dumping position (FIG. 8).

The hopper 35 is moved continuously from the position illustrated in FIG. 1 to the position illustrated in FIG. 8 through sequential positions illustrated in the Figures therebetween by hopper moving means or a hopper moving mechanism which is generally designated by the reference numeral 60. The hopper moving means 60 moves the hopper 35 from its first, nondumping or travel position (FIG. 1) to its over-the-cab predumping position (FIG. 7) and subsequently to its dumping position (FIG. 8) along a compound path of travel from the rear end 13 of the frame F to front end 12 which includes a generally longitudinal path of travel combined with a generally arcuate path of travel. This direction of movement is reversed when the hopper moving means 60 moves the hopper 35 from the dumping position (FIG. 8) back to its nondumping or travel position (FIG. 1).

Figure 9:
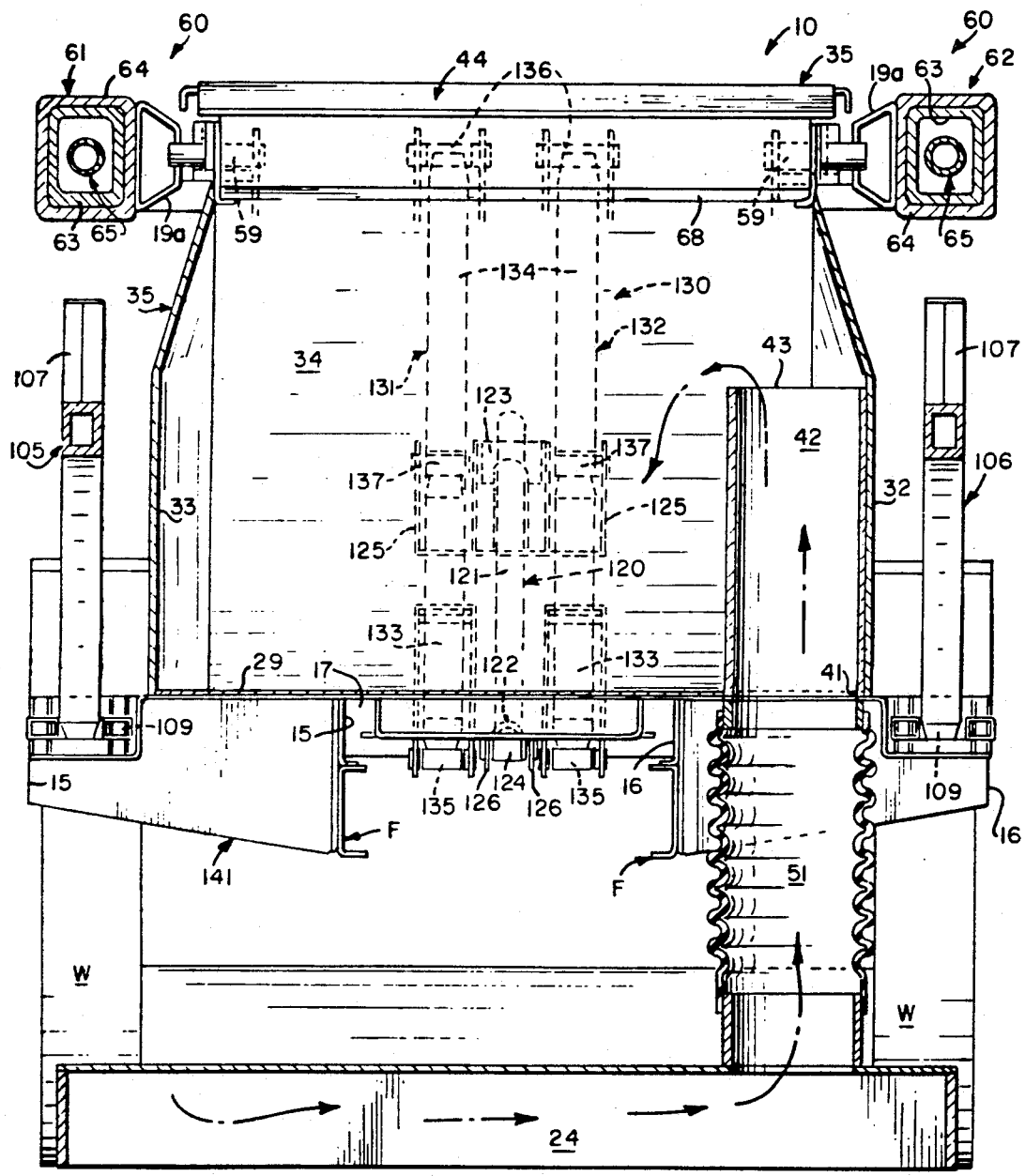
FIG. 9 is a cross-sectional view taken generally along line 9—9 of FIG. 1, and illustrates the two control arms, the two pairs of extendable and retractable telescopic members, the pairs of links of the occupant-protection system, and the hopper dumping cylinder.
Figure 10:
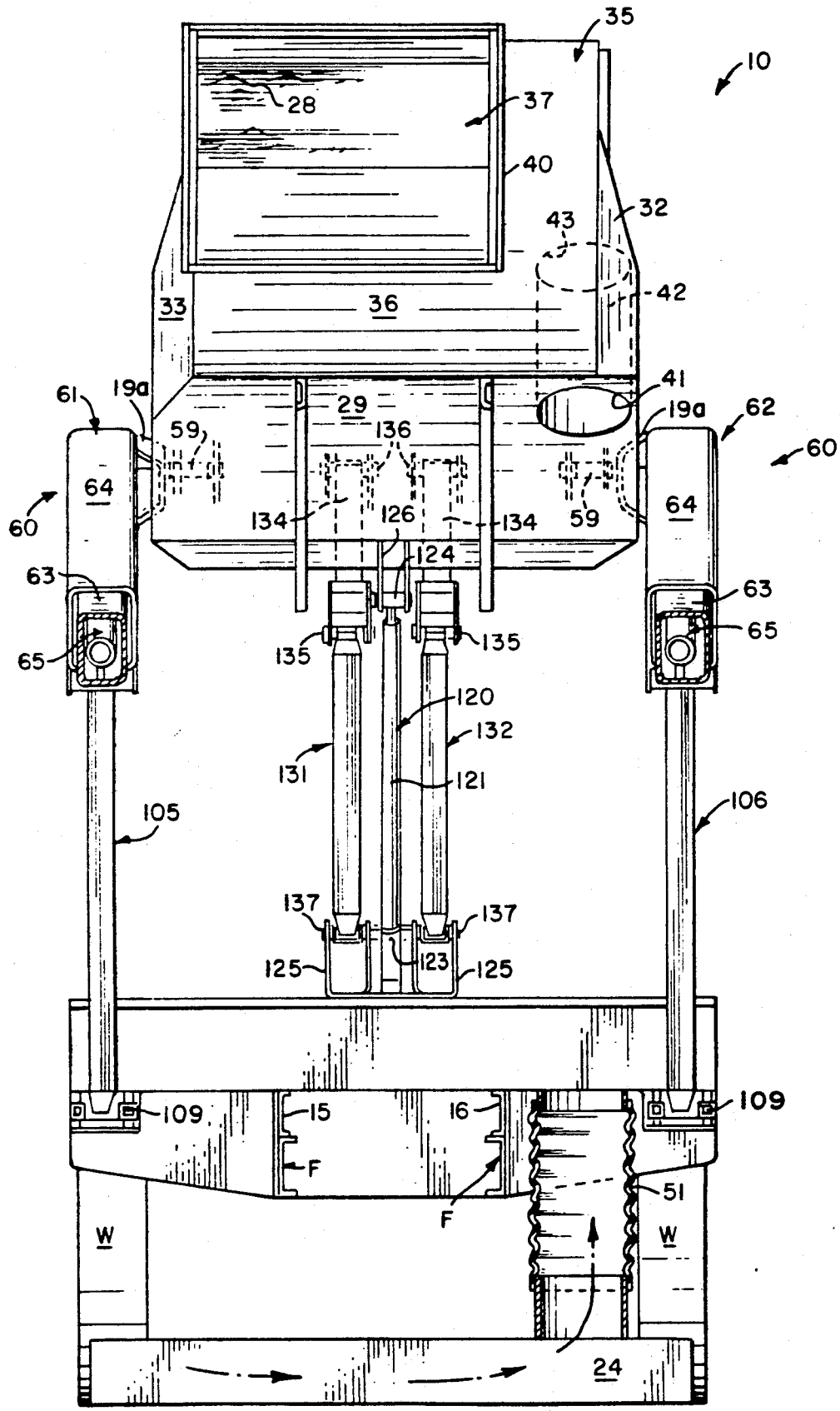
FIG. 10 is a cross-sectional view taken generally along line 10—10 of FIG. 6, and illustrates much of the details of FIG. 9 with the hopper one figure in the sequence removed from its over-the-cab or pre-dumping position, and particularly illustrates a circular inlet opening in a bottom wall of the hopper and a rectangular outlet opening in a rear wall of the hopper.
Figure 11:
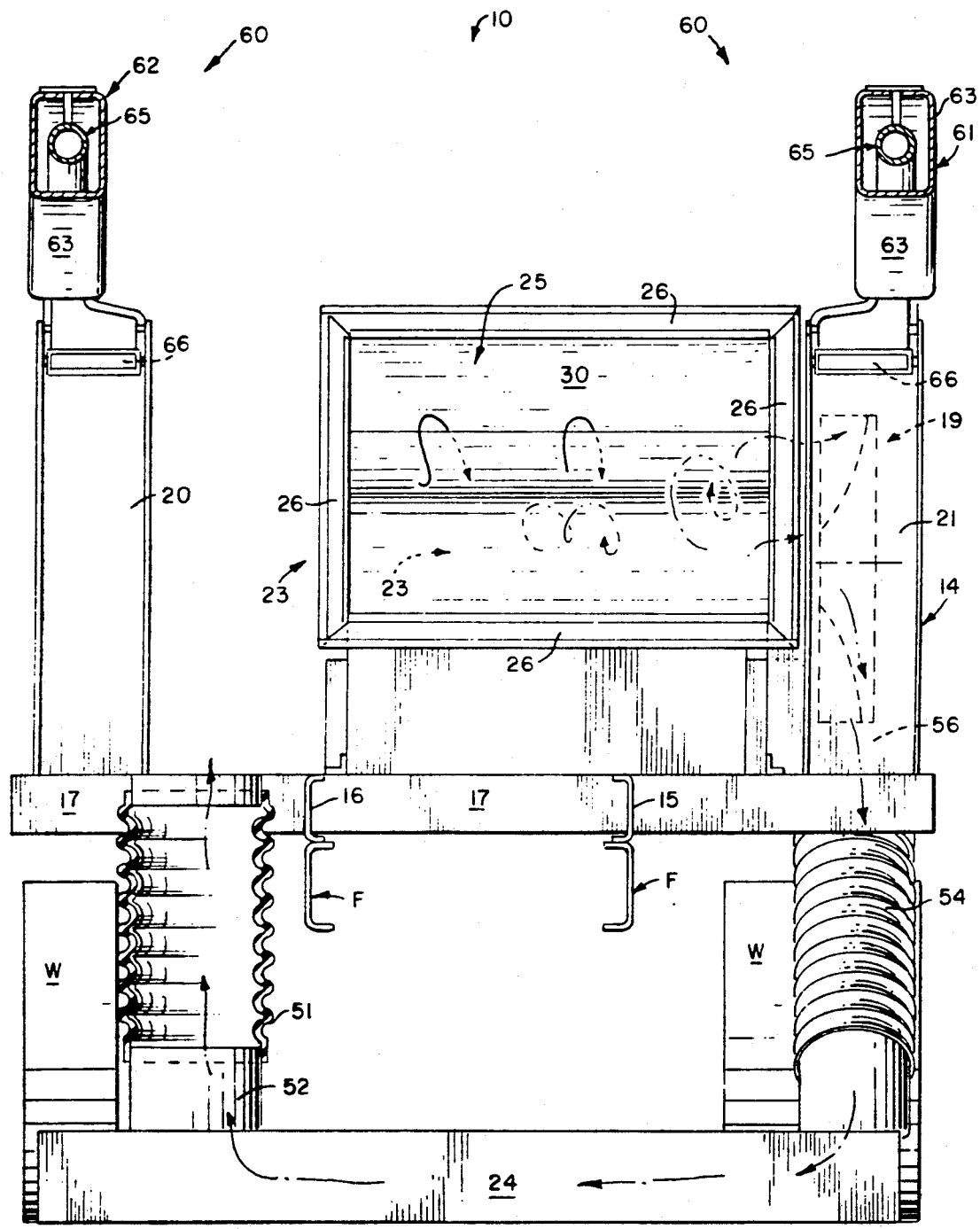
FIG. 11 is a cross-sectional view taken generally along line 11—11 of FIG. 6, and illustrates side walls of the frame, the centrifugal separator therebetween, and a rectangular opening of the centrifugal separator which matches the rectangular opening of the hopper.

The hopper moving means or mechanism 60 includes first and second pairs of extendable and retractable members or sliders 61, 62 (FIGS. 1 through 12), each of which includes inner and outer telescopic members 63, 64, respectively, each of which is generally of a box-like or square cross-sectional configurations (FIGS. 9 and 10). The outer members 64 of each of the pairs of extendable and retractable pairs 61, 62 are transversely connected by beams or members 68, 69. The hopper 35 is connected by transversely aligned pivots 59 (FIG. 9) to brackets 19a welded to the beam 68 and to the outer members 64, 64.

Means for selectively extending and retracting each of the members 63, 64 relative to each other is through a hydraulic piston/cylinder mechanism 65 (FIG. 12) which is part of a hydraulic circuit 70 (FIG. 14) which will be described more fully hereinafter. Each inner member 63 is articulately or pivotally connected by pivot means 66 to the associated upstanding side walls 20, 21 (FIG. 11) of the sweeper frame 14. A pivot 71 (FIG. 12) pivotally connects a rod 72 of each hydraulic piston/cylinder mechanism 65 to its associated inner member 63 adjacent the pivot 66 while another rod 73 of each hydraulic piston/cylinder mechanism 65 is connected by a pivot 74 to the outer member 64. As is best illustrated in FIG. 12, the rod 72 is relatively short and is connected to a large diameter (6 inch) piston 81 housed in a cylinder 82 while the rod 73 is relatively long and is connected to a small (4 inch) piston 83 housed in a cylinder 84. A divider plate 85 separates the cylinders 82, 84 and includes a high pressure inlet port 86 and a bore 87 which places the head ends of the cylinders 82, 84 in constant fluid communication with each other. Pipes 90, 91 open into the cylinders 84, 82, respectively, at the rod ends, are in fluid communication with each other by a bore 92 in the divider plate 85, and a port 93 in fluid communication with the bore 92 is in fluid communication with a reservoir 95 (FIG. 14) of the hydraulic circuit 70. Obviously, when each of the hydraulic piston/cylinder mechanisms or dump cylinders 61, 62 are completely retracted, as in FIG. 12, the extendable and retractable members 63, 64 are also fully retracted (FIG. 1), while the converse is also true (FIGS. 7 and 8). Under certain circumstances the double-rod cylinders 65 can instead each be only a single-rod cylinder.

Control or rotator arms 105, 106 are rigid members, and each includes a generally triangular metallic plate 107 having a relatively square cut-out or notch 108. Pivots 109 are in transverse alignment with each other and pivotally connect the control arms 105, 106 to the respective side frame members 15, 16 (FIG. 9) of the sweeper frame 14. Transversely aligned pivots 110 articulately connect the control arms 105, 106 to the outer member 64 of the respective pairs of extendable and retractable members 61, 62 (FIG. 1).

Figure 14:
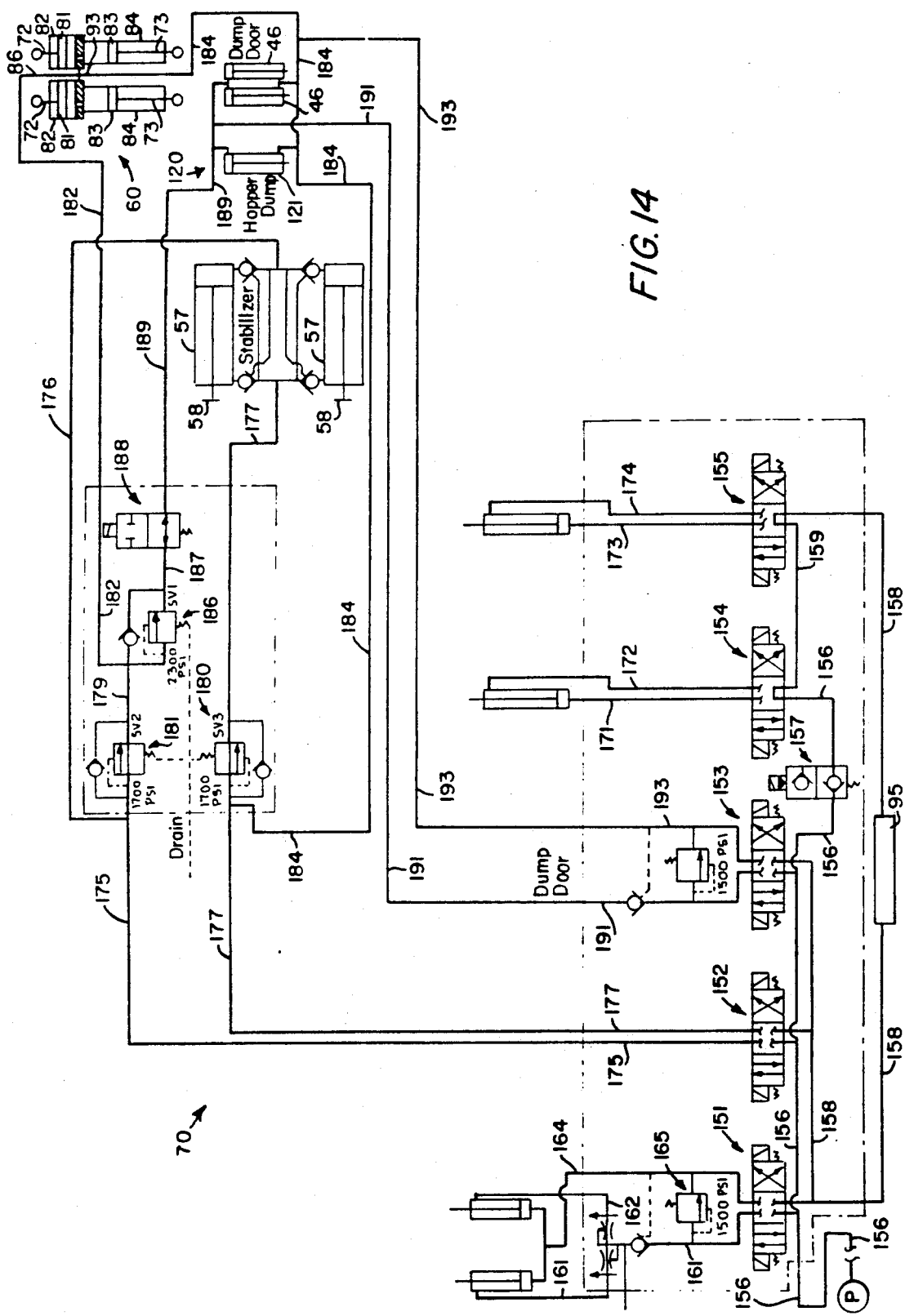
FIG. 14 is a schematic view of a hydraulic circuit, and illustrates various fluid cylinders and valves for effecting the movement of the hopper between the positions shown in FIGS. 1 through 8 and the reversal thereof.

Another hydraulic piston/cylinder mechanism or hopper dump cylinder 120 (FIGS. 1, 8 and 10) is formed by a hydraulic cylinder 121 and a piston rod 122 which are respectively connected by pivots 123, 124 to respective brackets 125, 126 of the frame 14 and hopper 35. The hopper tilting or dump cylinder 120 is located on a longitudinal center line of the vehicle 11, and inlet and exhaust ports thereof (not shown) are appropriately connected to the hydraulic circuit 70 (FIG. 14). At any time between the position shown in FIGS. 1 through 7, the rod 122 of the hopper tilting cylinder 121 of the hopper tilting mechanism 120 is fully retracted, and in this position the hopper tilting mechanism 120 guides the hopper 35 over the cab C in the absence of contact therewith (See FIGS. 1 through 8). It is only after reaching the predumped or over-the-cab position in FIG. 7 that the rod 122 is extended to the position shown in FIG. 8 to tilt the hopper 35 about the pivots 59 incident to the dumping of debris D from the hopper interior upon the opening of the hopper door 44, as will be described more fully hereinafter.

The sweeper 10 also includes an occupant protection system or mechanism 130 (FIGS. 1 through 10) which protects an occupant in the cab C at all times during the operation of the hopper moving means or dumping mechanism 60, but particularly when the hopper 35 is near and in its predump position (FIG. 7) and its dumping position (FIG. 8). Unless otherwise provided for, it will be readily apparent from FIG. 8 that should the hopper tilting or dumping mechanism 120 fail, the hopper 35 would pivot clockwise, as viewed in FIG. 8, about the pivots 59 and crash into the cab C damaging the same and causing injury to occupants therein. The vehicle occupant protection mechanism 130 prevents the latter from occuring through two pairs of protection members or links 131, 132 (FIGS. 7, 8, 9 and 10) immediately adjacent and straddling the hopper tilting mechanism 120. Each pair of occupant protection links 131, 132 includes an upper link or member 133 and a lower link or member 134. The links or members 133, 134 of each of the pairs 131, 132 are pivotally connected to each other by a pivot pin 135. The upper links or members 133 are pivotally connected by a pivot pin 136 to appropriate brackets (unnumbered in FIGS. 9 and 10) projecting from the transverse beam 68 spanning and connected between the outer extendable and retractable members 64. Pivot pins 137 connect the lower ends of the lower links or members 134 to the sweeper frame 14. The upper links 133 and lower links 134 are generally compactly folded relative to each other and are disposed between the cab C and the hopper 35 when the hopper 35 is in its nondumping or travel position (FIG. 1). However, as the hopper 35 is moved toward its final dumping position (FIG. 8), the upper and lower links 133, 134 at each side of the hopper tilting mechanism 120 simultaneously unfold as pivoting occurs about the pivot pins 135, 136 and 137, as is progressively illustrated in FIGS. 2 through 6. In FIG. 6, the upper links 133 generally underly the front wall 34 of the hopper 35 and occupy a position between the hopper 35 and the cab C. The final position of the occupant protection mechanism 130 is shown in FIG. 7 in which the upper links 133 underly the hopper 35 and prevent the hopper 35 from descending downwardly into and/or against the cab C and any occupants therein. The upper links 133 remain in the position shown in FIG. 7 as the hopper 35 is tilted (FIG. 8) and, as earlier noted, should the tilting mechanism 120 fail and the hopper 35 swing clockwise about the pivots 59, as viewed in FIG. 8, the hopper 35 would strike the upper links or members 133 and further descent to, toward and against the cab C would be precluded thereby protecting the cab and the occupants therein.

Before describing the overall operation of the sweeper 10, reference is made to FIG. 14 and the details of the hydraulic circuit 70. The hydraulic circuit 70 includes three valves 151 through 153 connected in parallel and two valves 154, 155 connected in series with these two sets of valves being connected to a high pressure fluid (oil) line 156 which includes an inline solenoid operated two-way valve 157. A pump P operated by the auxiliary engine (not shown) pressurizes the fluid in the high pressure line 156, and a return, exhaust or low pressure line 158 and its several branch lines returns the fluid to the reservoir 95. The valves 151 through 155 are illustrated being held in their neutral position by associated springs, and in this position flow is blocked to the associated hydraulic equipment. The valve 151 controls the up-and-down motion of the pick-up head 24; and the valves 154, 155 control the operation of the left and right gutter brooms, respectively, as is more fully detailed in the earlier mentioned Young patents: the valve 153 controls the operation of the dump door 44 and the valve 152 controls the operation of the stabilizers 57, the hopper tilt mechanism 120 and the hopper moving mechanism 60.

When the valve 151 is moved to the right, high pressure from the line 156 passes through the valve 151, a line 161 and is divided by appropriate flow regulators (unnumbered) before entering the rod ends of a pair of pick-up head cylinders (unnumbered) through conduits 161, 162 resulting in the pick-up head 24 being moved upward relative to surface S. A line 164 connected to the cylinder ends of both of the pick-up head cylinders connects the low pressure or cylinder side of the pick-up head cylinders to the line 158 through the valve 151 to deliver exhaust fluid through the valve 151 to the reservoir 95. At 1,500 psi a valve 165 relieves pressure by recirculating the high pressure fluid directly from the line 161 into the line 164 and through the valve 151 and line 158 and back to the reservoir 95. The pick-up head 24 is moved downwardly toward the surface S by shifting the valve 151 completely to its left position at which time high pressure fluid from the line 156 passes through the valve 151 into the line 164 into the cylinder ends of the pick-up cylinders extending the pistons and lowering the pick-up head 24. The pick-up cylinders are exhausted to the reservoir 95 over the lines 161, 162, the valve 151 and the line 158.

The left-hand and right-hand gutter brooms (not shown) can be serially operated by moving either of the respective valves 154, 155 to the right. When the valve 154 is moved to the right, high pressure fluid flows through the high pressure line 156 and the valve 157 therein through the valve 154 and a line 171 into the cylinder end of the left gutter broom cylinder per the appropriate Young patents heretofore noted. Low pressure fluid exhausts from the rod end of the cylinder through a line 172, the valve 154 and a line 159 connected to the valve 155 which in its neutral position (shown) delivers the low pressure fluid to the reservoir 95 via the line 158 exiting the valve 155. Movement of the valve 154 to the left directs high pressure fluid into the rod end of the left-hand gutter broom cylinder via the line 172 with the return to the reservoir 95 from the cylinder end being through the line 171, the valve 154, the line 159, the valve 155 and the line 158.

With the valve 154 in the neutral position illustrated, the right-hand gutter broom (not shown) is extended by moving the valve 155 to the right which will deliver high pressure fluid through the line 156, the valve 157, the valve 154, the line 159 and through a line 173 into the cylinder end of the gutter broom cylinder. Low pressure return fluid is delivered through a line 174, the valve 155 and the line 158 to the reservoir 95.

The hopper 35 movement sequence from its nondumping or travel position (FIG. 1) to its pre-dumping position (FIG. 7) is initiated by moving the valve 152 to the right which conducts high pressure fluid from the line 156 through the valve 152, a line 175 and a line 176 to the cylinder ends of the stabilizers or stabilizer cylinders 57 resulting in the rods thereof moving outwardly of the cylinders and completely bottoming therein thereby bringing the feet 58 into contact with the ground S at a predetermined repetitive extended distance. The rod side of each of the cylinders 57 is exhausted by a low pressure return line 177 through the return side (shown) of a valve 180, and the valve 152 to the reservoir 95 via the line 158. When the pressure in the stabilizer cylinders 57 reaches 1700 psi, the valve 181 shifts high pressure fluid flows from the line 175 through the valve 181, a line 179, and a line 182 into the inlet port 86 (FIG. 12) of the cylinders 82, 84 of the hopper moving mechanism 60 which through the outward motion of the rods 72, 73 progressively moves the outer members or sliders 64 in the direction of the cab C under the control of the control arms 105, 106. This same movement of the sliders 64 also pivots the hopper dump cylinder 120 about the pivot 123 to guide the hopper 35 between the FIGS. 1 through 7 positions thereby guiding the hopper 35 over the cab C. The exhaust port 93 of the cylinders 82, 84 is connected over by a line 184 to the low pressure return line 177.

Eventually the rods 72, 73 are fully extended (FIG. 7), pressure builds-up in the cylinders 82, 84, and at 2300 psi a valve 186 shifts from the position illustrated with the result that high pressure fluid from the line 179 flows through the valve 186, a line 187, a normally open valve 188 and a line 189 to the inlets of the dump door cylinders 46 and the hopper tilt or hopper dump cylinder 121. Since the hopper 35 is relatively heavy, particularly when filled to capacity with debris D, the pressure in line 189 will first open the dump door 44 of the hopper 35 and only thereafter begin tilting the hopper 35 through the hopper dumping mechanism 120 until the debris D has been dumped. The low pressure or return side of the cylinders 46, 121 are connected to the line 184 which in turn is connected to the low pressure return line 177. Obviously, at the conclusion of the dump cycle, the valve 152 is moved to the left and the operation just described is essentially repeated in the reverse sequence to first close the dump door 44 of the hopper 35, return the hopper 35 to its nontilted position (FIG. 7), and fully retract the rods 72, 73 into their respective cylinders 82, 84 (FIG. 1) when the pressure in the cylinders 82, 84 reaches 1700 psi at full retraction, the valve 180 shifts, high pressure fluid flows from line 177 through the valve 180 therein and into the rod end of the stabilizer cylinders 57 to retract the stabilizer feet 58 thereof.

The valve 153 of the hydraulic circuit 70 is for opening or closing of the dump door 44 of the hopper 35 for inspection or cleaning purposes without cycling the mechanism 60 in either direction by operating the valve 152 as just described. In this case the valve 152 remains in the position shown in FIG. 14, the valve 188 is moved to its blocked position, and the valve 153 is moved to the right conducting high pressure fluid from the line 156 through the valve 153 and through a line 191 into the inlets of the dump door cylinders 46 and the hopper tilt cylinder 121. The line 191 also connects to the line 189, but the latter is now blocked by the valve 188. Because of the heavy weight of the hopper 35, as compared to the dump door 44, only the dump door cylinders 46 will be operative with the exhaust side of the dump door cylinders 46 being returned to the reservoir 95 via the line 184, a line 193, the valve 153, and the line 158. Shifting the valve 153 to the left and closing valve 188 reverses the cycle to close the hopper dump door 44 via the reverse flow of high pressure fluid into the rod end of the cylinders 46 via the line 193 and line 184 and the return of exhaust liquid through the line 191 to the reservoir 95.

OPERATION

The operation of the sweeper 10 includes the performance of an appropriate sweeping operation during which either of the gutter brooms are extended and the pick-up head 24 is adjacent the surface S. As the vehicle 11 is driven forwardly, the rotating brush of the gutter broom directs debris toward the pick-up head 24 and high pressure air flow, as heretofore described, continuously generally recirculates this air and the entrained debris D to, into and through the hopper 35 and the centrifugal separator 23 (FIG. 13). After the hopper 35 is filled with debris, the pick-up head 24 is retracted upwardly, as is either of the gutter brooms, and the sweeper 10 is then driven to an appropriate dump site. The vehicle 11 is, of course, driven forwardly directly to the dump site and when appropriately positioned, the valve 152 of the hydraulic circuit 70 (FIG. 14) is moved to the right to set in operation the cycle sequence heretofore described beginning with the stabilizers 57 bringing the feet 58 thereof against the surface S to prevent the weight of the hopper 35 and its contents, as it moves over the cab C, from placing excessive forces upon the front end suspension system of the vehicle 11.

After pressure reaches 1700 psi in the stabilizers 57, the high pressure fluid is introduced into the inlet port 86 (FIGS. 12 and 14) of the hopper moving mechanism 60 resulting in the initial movement of the rod 72 due to the larger diameter of the piston 81 as compared to the smaller diameter of the piston 83. Eventually, however, both rods 72, 73 are fully extended and during this progressive extension, the members or sliders 64 are progressively and continuously extended to the left relative to the members 63 through the sequence illustrated in FIGS. 2 through 7 of the drawings. At this time the rigid control arms 105, 106 and the hopper dump mechanism 120 are also pivoted counterclockwise from their "home" positions shown in FIG. 1 to the final position of FIG. 7. The operation of the control arms 105, 106 effectively translates the purely linear relative motion of the member 63, 64 into compound motion by imparting an arcuate component thereto, as defined by the length of the control arms 105, 106 between the pivots 109, 110 thereof. As earlier noted, the hopper dump mechanism 120 simultaneously guides the hopper 35 over the cab C. During this motion, the control arms 105, 106 reach a position shown in FIG. 5 which is almost vertical, and at this point the left-hand ends of the members 64 are essentially at their maximum vertical height above the surface S to provide ample clearance for the hopper 35 during the continued forward motion of the hopper 35 to its over-the-cab position (FIGS. 7 and 8). From slightly past the position shown in FIG. 5, the control arms 105, 106 begin lowering the forward ends of the members 64 downwardly (compare FIGS. 5, 6 and 7) until such time as the members 63, 64 are relatively fully extended (FIG. 7) and the hopper 35 is in its over-the-cab/predump position. The entire motion of the mechanism 60 between FIGS. 1 and 7 is effected only under the pressurization of the cylinders 82, 84 and the attendant outward telescopic motion of the members 64 relative to the members 63. Furthermore, the initial position (FIG. 1) of the members 63, 64 and the control members 105, 106, including the triangulation defined by the pivots 109, 110 and 66, assures that the hopper 35 and the centrifugal separator 23 part or separate smoothly across the plane Ps, and also return in sealing engagement at the plane Ps. This same movement also "unfolds" the occupant protecting mechanism 130 through the progressive motion illustrated sequentially in FIGS. 1 through 7 until the links 133 of both pairs of occupant-protective links 131, 132 underlie the hopper 35 and prevent the hopper 35 from descending downwardly into the cab C or any occupants therein.

At the end of the maximum extension of the members 64 and the acquired 2300 psi pressure in the associated cylinders 82, 84 (FIG. 12), the notches 108 of the control arms 105, 106 are contiguous the upper ends of the stabilizers 57 (FIG. 7). Should the hydraulic circuit 70 fail, the entire mechanism 60, the hopper 35 and its load would be solely mechanically supported thereby avoiding what might otherwise be catastrophic damage to the vehicle/its components. At the same time, the dump door cylinders 46 operate resulting in the opening of the hopper door 44 and the pulling of the link 50 (FIG. 8) resulting in the shaking or flexing of the deflector 47 and the self-cleaning thereof.

Next in the sequence of operation is the extension of the rod 122 from the cylinder 121 of the hopper dumping mechanism 120 causing the hopper 35 to pivot about the pivots 59 and the debris D being dumped over-the-cab C into the designated dump area. The latter is, of course, effected without endangering the sweeper 10, the occupants of the cab C, outsiders or outside property incident to backing the vehicle to the dump site which, of course, is unnecessary in accordance with the present invention.

Obviously, the reverse sequence of operation of the hydraulic circuit 70 heretofore described results in the sequential operation of the various components and the return of the hopper 35 from the position shown in FIG. 8 to the position shown in FIG. 1.

Figure 15:
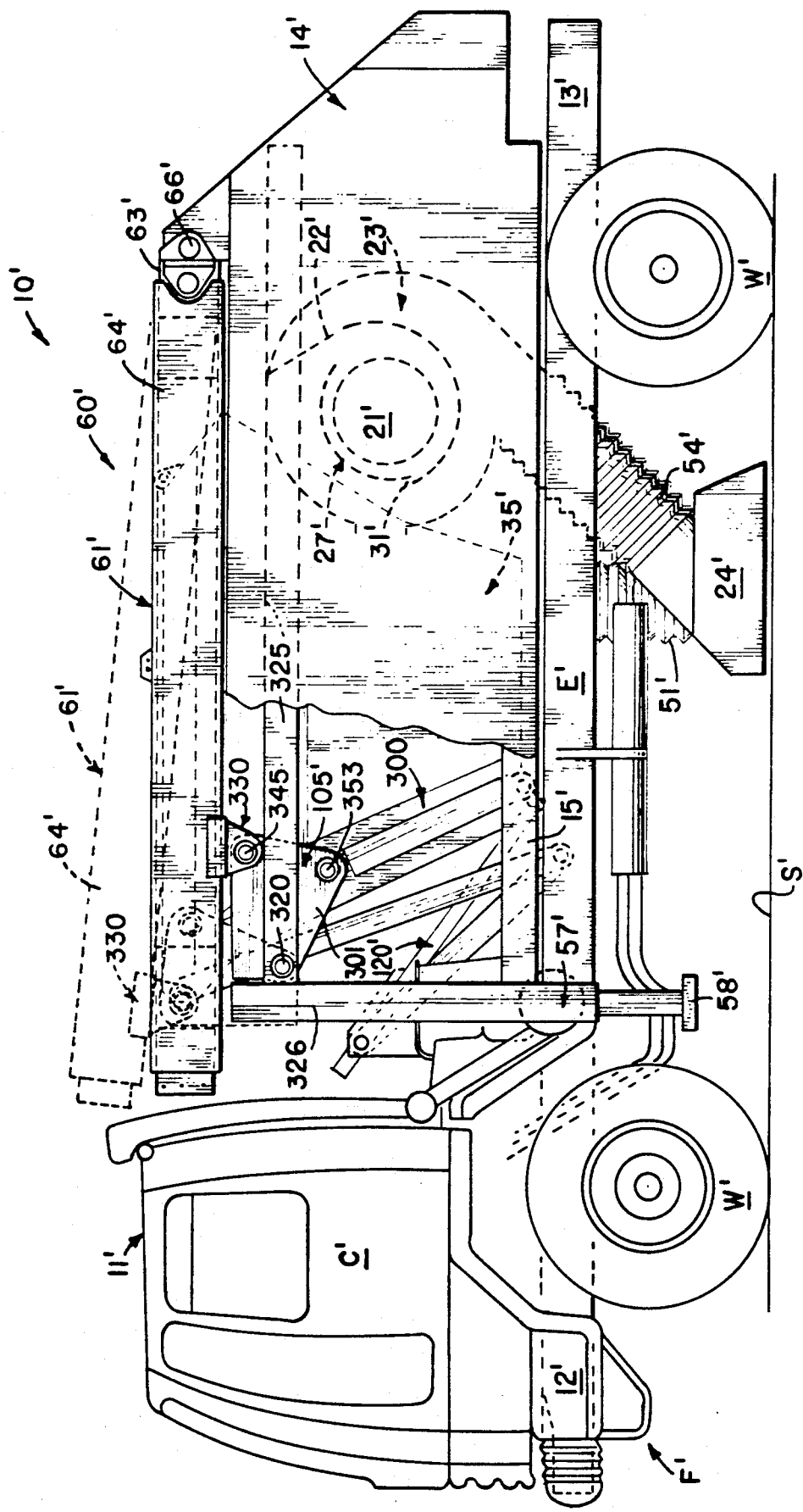
FIG. 15 is a schematic side elevational view of another over-the-cab hopper dumping street sweeper of this invention, and illustrates a hopper located between a cab of the vehicle and a centrifugal separator, one of a pair of relatively extendable and retractable first and second members pivotally connected to the hopper and to the vehicle frame, and one of a pair of hydraulically operated generally horizontally disposed control arms or rotators articulately coupled between the vehicle frame and one of the associated retractable members.

In keeping with a second embodiment of the invention, another novel high-dump or over-the-cab road sweeper, street sweeper or sweeping machine is illustrated in FIGS. 15 and 16 of the drawings, and is generally designated by the reference numeral 10'. Since the street sweeper 10' is similar to the street sweeper 10, structure which is identical has been identically numbered and primed as, for example, the fact that the street sweeper 10' includes a conventional vehicle 11' having a frame F', an occupant cab C' at a front end or front end portion 12' of the frame F', a rear end or rear end portion 13', and wheels W' appropriately conventionally suspended from the frame F'.

A sweeper frame 14' is rigidly secured to the vehicle frame F' and includes generally parallel spaced-apart side frame members 15', only one of which is illustrated. A pair of upstanding generally parallel spaced sidewalls 21', of which only one is illustrated, are secured to the frame members 15' and situated therebetween is a centrifugal separator 23'. A conventional pick-up head 24' removes debris from a surface S' and conducts the same through a pipe or conduit 51' into the centrifugal separator 23'. The centrifugal separator 23' discharges debris into a hopper 35' when the latter is in the position shown in FIG. 15.

The hopper 35' is moved between the position shown in FIGS. 15 and 16 in a manner to be described fully hereinafter by a hopper dump mechanism 120', and in the latter position a hopper door 44' can be pivoted open by hopper door cylinders 46'. The hopper 35' is pivoted further counterclockwise beyond the position illustrated in FIG. 16 about pivot pins 136' to dump debris from the hopper 35'. In the predumping and dumping positions of the hopper 35' (generally FIG. 16), the vehicle occupant protection mechanism 130' defined in part by the links 133', 134' pivoted at 135' affords an occupant in the cab C' the protection heretofore more completely described relative to the street sweeper 10.

Figures 19, 20:
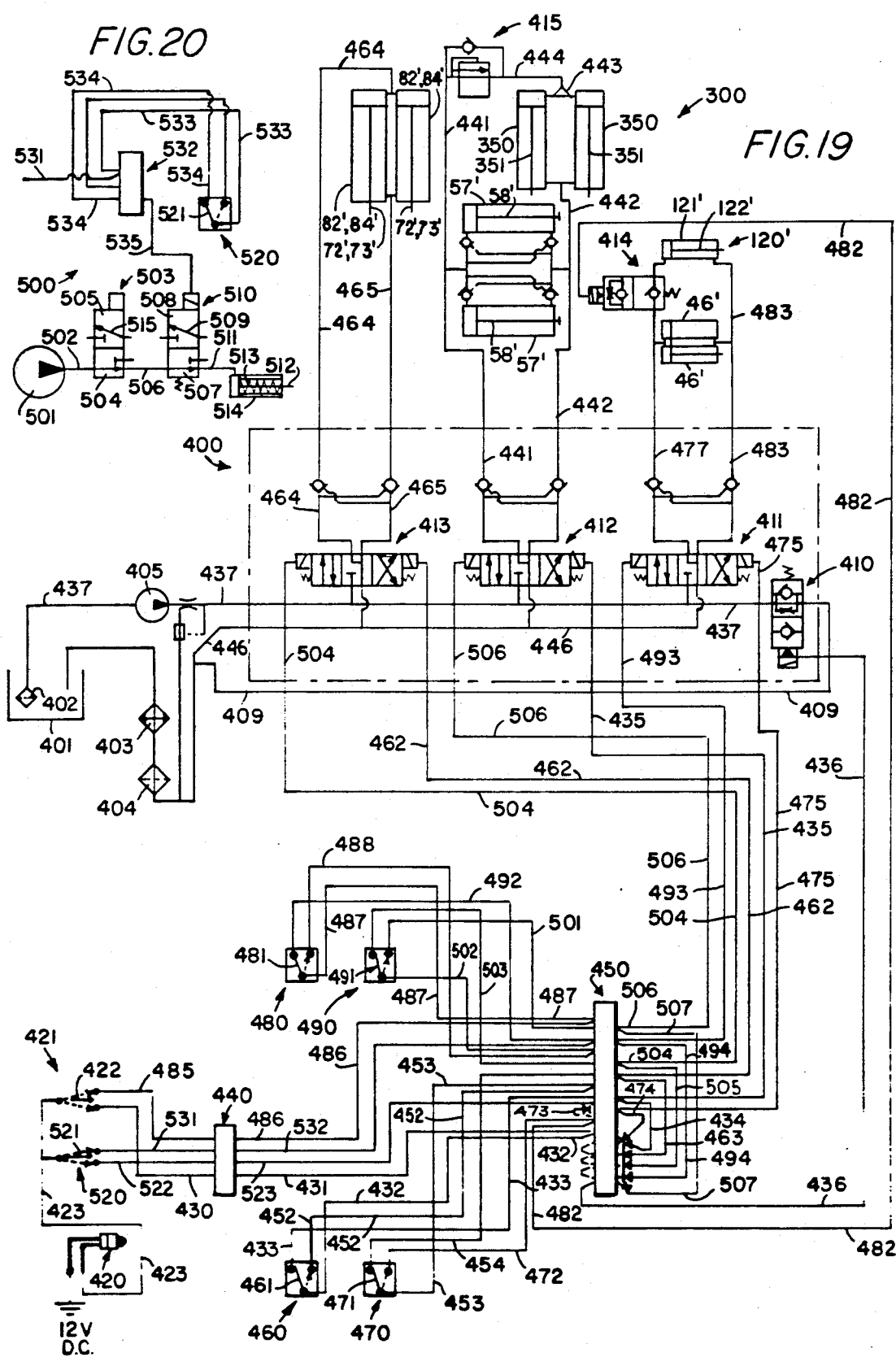
FIG. 19 is a diagram of a hydraulic and electric system, and illustrates circuitry for effecting hydraulic operation of the hopper cycle.
FIG. 20 is a diagram of a system for effecting automatic hydraulic locking of the vehicle brake system.

Similarly, during the movement of the hopper 35' from the position shown in FIG. 15 to the position shown in FIG. 16, a hopper slider mechanism 60' is operative. The mechanism 60' includes two generally parallel extendable and retractable members of sliders 61', only the latter being illustrated, which are each defined by inner and outer telescopic members 63', 64', respectively. The telescopic members 63', 64' are selectively reciprocated in unison by slider fluid cylinder mechanisms 72', 73', 82' and 84' (FIG. 19).

A significant difference in the structure of the two sweeping machines 10, 10' resides in the specific arrangement and operation of control arm 105' associated with each of the extendable and retractable members 61' and specifically the outer telescopic members 64' thereof. Another control arm, similar in all respects to the control arm 105', is located parallel thereto but is not shown in the drawings, but the description immediately hereinafter of the control arm 105' is applicable to the unillustrated control arm.

In the case of the control arms 105, 106 of the street sweeper 10, the control arms 105, 106 are pivoted to frame members 15, 16 by pivot pins 109 and to the sliders 64 by pivot pins 110. The control arms 105, 106 are rigid fixed-length links and are moved between the positions thereof illustrated in FIGS. 1 and 8 strictly by the motion imparted to the extendable and retractable members 61, 62. However, in the case of the control arms 105', (and the unillustrated control arm) each control arm 105' (and the unillustrated control arm) is moved from the position illustrated in FIG. 15 to the position shown in FIG. 16 by control arm moving means generally designated by the reference numeral 300. Furthermore, the following description of the control arm moving means 300 associated with the control arm 105' is equally applicable to the unillustrated control arm located at the opposite side of the vehicle 10'.

The control arm or rotator 105' (FIGS. 17 and 18) includes a pair of generally trapezoidal steel plates 301, 302. The plate 301 has three circular openings 303, 304, 305 adjacent respective corners 306, 307, and 308. A bushing 310, 311 and 312 is inserted in the respective openings 303, 304, 305 and welded to the metal at the respective corners 306, 307, and 308.

The plate 302 is identically constructed to the plate 301 and therefore those elements visible in FIG. 18 have been identically numbered and primed. The plates 304, 302 are rigidly connected to each other in spaced parallel relationship by four steel plates 313-316 which span the plates 301, 302 and are welded thereto.

A pivot pin 320 (FIG. 18) passes through the bushings 311, 311' and is press-fit in annular fittings 321, 322 which are in turn press-fit in openings (unnumbered) in respective webs 323, 324 of a beam 325 (FIGS. 15 and 16) welded to an upper extended box beam portion 326 (FIGS. 15 and 16) of the stabilizer 57'. Each beam or frame member 325 (and 15') is welded to the associated side wall 21'.

A generally L-shaped slider 330 (FIG. 18) is defined by a generally vertical web 331, a horizontal web 332, and a pair of generally spaced parallel angular webs or plates 333, 334. One or more low coefficient of friction wear plates 335, 336 and 337 are fastened to the inner surfaces (unnumbered) of the webs 331, 332, and these plates 335, 336 are in sliding engagement with the outer telescopic member 64' of each of the pair of extendable and retractable members 61'. The plates 333, 334 have respective circular openings 341, 342 formed therein in which are received respective annular bushings or fittings 343, 344. The bushings or fittings 343, 344 are welded to the respective plates 333, 334. Another pivot pin 345 is press fit in the bushings 343, 344 and passes through the bushings 310, 310' housed in circular openings 303, 303' of the plates 301, 302, respectively.

From the foregoing it is readily apparent that the control arm 105' is articulately or pivotally coupled or connected by the pivot pin 320 to the frame member 325 of the frame F' while the pivot pin 345 and the slider 330 define another coupling connection between the control arm 105' and the associated telescopic member 64'. The latter coupling or connection is, of course, a pivoted connection between the slider 330 and the control arm 105' and a sliding connection between each telescopic member 64' and the L-shaped slider 330 associated therewith.

The control arm or rotator moving means 300 for operating the control arm or rotator 105' is a hydraulic piston-cylinder mechanism which includes a hydraulic cylinder 350 and a piston rod 351 having a piston (not shown) mounted for reciprocal movement within the cylinder 350 in a conventional manner. (An identical means 300 [not shown] is associated with the unillustrated rotator on the opposite side of the vehicle 10'.) A pivot pin 352 connects each of the two cylinders 350 (FIG. 16) to the frame members 15' while a pivot pin 353 (FIG. 17) connects each rod 351 (FIG. 16) to the associated control arm 105 and the unillustrated control arm. The pivot pin 353 is press fit in the bushings 312, 312' (not shown) of the plates 301, 302, and a suitable journal (not shown) surrounds the pivot pin 353 and is welded to each piston rod 351. Thus, the upper end of each piston rod 351 can rotate via its journal relative to each fixed pivot pin 353.

When the piston rods 351 of the two rotator moving means 300 are retracted in the respective cylinders 350, the control arms 105' (and the unillustrated control arm) are disposed generally in the horizontal position shown in FIG. 15 which is the home or "travel" position of the vehicle 10'. In this position a lower web (unnumbered) each of the beams 325 is removed or cutaway to allow the control arms 105' (and the unillustrated control arm) to pass therethrough, as is most evident in FIG. 15. As the piston rods 351 are extended outwardly of the cylinders 350 from the position shown in FIG. 15 to the position shown in FIG. 16, prior to any actuation of the extendable and retractable members 60', each control arm 105' (and the unillustrated control arm) is pivoted about its pivot pin 320 in a counterclockwise direction, as viewed in FIGS. 15 and 16 which raises the members 61' from the solid line position to the phantom outline position shown in FIG. 15. During this movement each control arm 105' (and the unillustrated control arm) not only pivots from the position shown in FIG. 15 to the position shown in FIG. 16, but during the latter pivoting movement each slider 330 also pivots relative to its associated control arm 105' (and the unillustrated control arm) and slides along the underside of the associated telescopic member 64' from the solid position shown in FIG. 15 to the phantom outline position shown in the same Figure. Thus, at the completion of the full extension of the piston rods 351 and upon the control arms 105' (and the unillustrated control arm) reaching the phantom outline position shown in FIG. 15, the extendable and retractable member 61' can now be freely extended and will pass above and beyond the top of the cab C' to the fully extended position shown in solid lines in FIG. 16.

When the rods 351 are retracted the control arms 105' (and the unillustrated control arm) associated with each rotator arm moving means 300 pivots clockwise about the respective pivot pins 320 after, of course, the extendable and retractable members 61' have been retracted and the hopper 35' has been moved to a position no longer overlying the cab C'. The latter pivoting motion returns the components of the vehicle 10' to the position shown in FIG. 15.

The operation of the vehicle 10', specifically with respect to the movement of the hopper 35' from its "travel" position (FIG. 15) to its dump position (beyond that illustrated in FIG. 16) and back again, will now be described in conjunction with a hydraulic and electrical system 400 of FIG. 19.

The hydraulic and electrical system 400 includes a tank 401 containing a hydraulic liquid (oil) and having a filter 402 therein, an in-line cooler 403, another filter 404 and a pump 405. Electrically actuated hydraulic control valves 411, 412 and 413, blocking valves 410, 414, and a stabilizer sequence valve 415 form major components of the hydraulic portion of the system 400. Four limit switches 460, 470, 480 and 490 having respective contact arms 461, 471, 481 and 491 are provided in the electrical portion of the system 400 for effecting in conjunction with the control valves 411-413 and the blocking valves 410 and 414 the appropriate sequencing or cycling of the hopper 35' between its "travel" and "dump" positions and the reverse thereof.

The system 400 includes a neutral dump switch 420 which requires that the transmission (not shown) of the vehicle 10' be placed in neutral, otherwise power will not flow to a dump sequence switch 421 over a line 423. However, when the transmission of the vehicle 10' is in neutral, power will flow through the line 423 and a contact arm 422 of the dump sequence switch 421 which is manually moved to its down dash-line position. Power flows through a line 430, a terminal block 440, a line 431, a terminal block 450, and a line 432 to the limit switch 460 which is suitably mounted on either upper end portion 326 of the stabilizers 57'. The contact arm 461 of the switch 460 is so located that it will be moved from the closed position illustrated to the open position by either the rotator arm 105' or the unillustrated rotator arm, when they have reached their fully rotated or upright position (phantom outline in FIG. 15). In the closed position of the switch arm 461, current flows through a line 433 to the terminal block 450 and over two lines 434, 435. The line 434 is connected to the terminal block 450 through a diode (unnumbered) and conducts power to a line 436 which in turn energizes a solenoid (unnumbered) of the blocking valve 410.

Normally, the blocking valve 410 allows high pressure liquid (oil) pumped by the pump 405 through a line 437 to pass through the blocking valve 410 and return to the tank 401 via a return line 409. However, when the solenoid shifts the blocking valve 410 to its blocking position the high pressure liquid is prevented or blocked from flowing beyond the blocking valve 410 and flows through the control valve 412 which is shifted to the right as power over the line 435 operates a solenoid (unnumbered) of the control valve 412. Hydraulic fluid (oil) is pumped from the tank 401 by the pump 405 through the hydraulic line 437 to the control valve 412 exiting the same through a line 441 and returning to the control valve 412 through a return line 442.

The lines 441 and 442 have conventionally pilot operated check valves (unnumbered) which automatically open and close during pressurization and exhaust in a conventional manner.

The hydraulic line 441 is connected to the head end of the stabilizer cylinders 57' and the head end of the slider rotator cylinders 350 through the stabilizer sequence valve 415 and a rotary flow divider 443. The rotary flow divider 443 assures pressure equalization to extend the rods 351 at the same rate. The stabilizer sequence valve 415 is normally closed and will not shift to its open position until 1000 psi has built up in the line 441. Therefore, initially the hydraulic fluid in the line 441 moves the rods 58' of the stabilizers 57' out of the cylinders until the same fully extend and/or contact the ground or surface S and in either event subsequently the pressure builds up beyond 1000 psi. When 1000 psi is reached the stabilizer sequence valve 415 automatically shifts to its in-line position conducting hydraulic fluid from the line 441 through a line 444 into the rotary flow divider 443 and into the head ends of the cylinders 350 of the rotator moving mechanism 300. The rods 351 move simultaneously outwardly of the cylinders 350 and pivot the control arm 105' and the unillustrated control arm from the solid to the phantom outline position shown in FIG. 15. The stabilizer cylinders 57' and the rotator cylinders 351 exhaust hydraulic fluid over the line 442 through the control valve 412 and a return line 446 back to the tank 401.

As soon as the rotators 105' (and the unillustrated rotator) have reached the vertical positions thereof (phantom outline in FIG. 15), the switch or contact arm 461 of the limit switch 460 is physically shifted by either of the rotator arms 105' (and the unillustrated rotator arm) to the normally open position, which is the dashed-line position of the contact arm 461 in FIG. 19. When the contact arm 461 shifts to the dashed-line position, current flows through a line 452 to the terminal block 450 and over a line 453 to the limit switch 470. The electrical flow is through the normally closed contact arm 471, over a line 454 to the terminal block 450 and to two lines or wires 462, 463. The line 462 is connected to a solenoid (unnumbered) of the control valve 413 which shifts the same to the right while the line 463 conducts power through an associated diode (unnumbered), the terminal block 450, and the line 436 to the blocking valve 410 which now shifts to block flow through the blocking valve 410. Hydraulic fluid from the pump 405 in the line 437 flows through the control valve 413 and through a line 464 into the head ends of the cylinders 82', 84' extending the rods 72', 73' while return fluid is exhausted from the cylinders 82', 84' through a return line 465. The lines 464 and 465 have conventionally pilot operated check valves (unnumbered) which automatically open and close during pressurization and exhaust in a conventional manner. As the rods 72', 73' are extended the telescoping members 63', 64' progressively move from the phantom outline position shown in FIG. 15 to the position shown in FIG. 16 until fully extended in the latter Figure. The contact arm 471 of the limit switch 470 is positioned such that it will be shifted from the normally closed position to the position shown in dashed lines in FIG. 19 by the telescoping member 64' upon its reaching its maximum extended position. At this point the hopper 35' is in the position shown in FIG. 16.

Upon the contact arm 471 of the limit switch 470 being moved to the dashed position, the power over the line 453 flows through the contact arm 471 and a line 472 to the terminal block 450 and from the latter through a line 473 and an associated diode (unnumbered) back to the terminal block 450 and from the latter through two lines 474, 475. Line 474 is connected through a diode (unnumbered) back to the terminal block 450 and flows through the line 436 while power in the line 475 operates a solenoid (unnumbered) of the control valve 411 shifting the same to the right. Power over the line 436 again shifts the blocking valve 410 to its blocking position to prevent hydraulic flow therethrough via the high pressure line 437 and thus high pressure in the line 437 flows through the control valve 411 and a line 477 to the blocking valve 414. The blocking valve 414 is normally in its blocked position blocking flow of hydraulic fluid therethrough and into the head end of the cylinder 121' of the hopper dump mechanism 120. However, the blocking valve 414 is moved to its unblocked position at the same time that the blocking valve 410 is moved to its blocking position. This occurs because the current through the line 472 which was conducted to the lines 474 and 475 by the line 473 is also conducted through a line 482 to the solenoid (unnumbered) of the blocking valve 414 unblocking the latter. Thus, the high pressure hydraulic fluid in the line 477 passes through the blocking valve 414 and into the head end 121 of the hopper cylinder 121' (FIG. 19) extending the rod 122' (FIG. 19) therefrom. Since the cylinders 46' and 121' are hydraulically connected in parallel, the hopper door 44' (FIG. 16) begins to open, and the hopper 35' begins to pivot about the pivots 136' (FIG. 16) from the position shown in FIG. 16 to the eventual full dump position (not shown). The cylinders 46', 121' are, of course, exhausted over a line 483 through the control valve 411 to the return line 446. The lines 477 and 483 have conventionally pilot operated check valves (unnumbered) which automatically open and close during pressurization and exhaust in a conventional manner. At this point the sequence of operation from "travel" to "dump" is completed.

In order to return the hopper 35' from its "dump" to its "travel" position, the transmission of the sweeper 10' must be kept in neutral because of the neutral dump switch 420, and the dump sequence contact arm 422 is moved from the lower dashed position to the upper dashed position in FIG. 19. Power flows through the line 423, the switch arm 422 and a line 485 into the terminal block 440 and from the latter through a line 486 to the terminal block 450 and a line 487 to the limit switch 480 whose contact arm 481 is in the normally closed solid line position illustrated in FIG. 19. Current flows through a line 492 back to the terminal block 450 and through lines 493, 494. Power in the line 493 shifts the solenoid (unnumbered) of the control valve 411 to move the valve fully to the left, while the line 494 conducts power through a diode (unnumbered) associated therewith, the terminal block 450, and the line 436 which in turn again moves the blocking valve 410 to its blocking position. Hydraulic fluid in the line 437 now flows through the control valve 411 into and through the line 483 into the rod ends of the cylinders 46', 121' with these cylinders being exhausted through the line 477, the control valve 411, and the return line 446. The rods of the cylinders 46', 121' retract simultaneously with the dump door 44' closing first and the hopper 35' eventually reaching its predump position (FIG. 16).

The hopper 35' or its cylinder 121' are so positioned as to contact and move the contact arm 481 of the limit switch 480 from the solid to dashed line position shown in FIG. 19 when the rod 122' is fully retracted. Power flows over the line 488 to the terminal block 450 and over a line 502 to the limit switch 490 which is closed with the contact arm 491 in its solid position. Current flows through a line 503 to the terminal block 450 and through two lines 504, 505. The line 504 energizes the solenoid (unnumbered) of the control valve 413 to shift the valve to its left-most position while current from the line 505 flows through a diode (unnumbered), through the terminal block 450 and the line 436 to once again shift the blocking valve 410 to its blocking position. High pressure hydraulic fluid in the line 437 cannot flow past the blocking valve 410 and therefore flows through the control valve 413 into and through the line 465 causing the retraction of the rods 72', 73' as hydraulic fluid exhausts through the line 464, the control valve 413 and return line 446. The retraction of the rods 72', 73' moves the telescopic members 63', 64' from the position shown in FIG. 16 to the phantom outline position shown in FIG. 15.

The limit switch 490 is so positioned that its contact arm 491 will be shifted from the solid to the dashed position in FIG. 19 upon the complete retraction of the telescopic members 64' reaching their phantom outline position in FIG. 15 which allows current to flow through the line 501 to the terminal block 450 and to two lines 506, 507. The line 506 energizes a solenoid (unnumbered) of control valve 412 and shifts the valve fully to the left while line 507 is connected by a diode (unnumbered) to the terminal block 450 and conducts current therefrom to and through the line 436 which again shifts the blocking valve 410 to its blocking position which in turn allows high pressure fluid in line 437 to flow through the control valve 412 and through the line 442 and into the rod ends of the stabilizer cylinders 57' and the rotator cylinders 350. The rods 351 rotate the rotator 105' and the unillustrated rotator from the phantom line position to the solid line position in FIG. 15 while the stabilizer rods 58' are likewise simultaneously retracted. When full retraction is completed, the contactor arm 422 of the dump sequence switch 421 is placed in its neutral position, and as the sweeper 10' is now in its "travel" position ready to move along the road or surface S and perform its sweeping function.

At times it is desirable for an operator to inspect the interior of the hopper 35' without in any way moving the hopper 35' from its "travel" position (FIG. 15). In the "travel" position the hopper door 44' is readily accessible from above, and when opened, the operator can view the interior of the hopper 44' for inspection and/or maintenance purposes. Obviously, in such cases the hopper dump mechanism 120' must not be activated, and thus the blocking valve 414 must necessarily be kept in its normally blocking position to prevent hydraulic fluid from entering the cylinder 121' and actuating the rod 122'.

The transmission of the vehicle 10' is again kept in neutral to allow power to flow past the neutral dump switch 420 over the line 423 to a dump door switch 520 having a contact arm 521 move from its normal neutral position to the down dashed position shown in FIG. 19. Current flows through a line 522, through the terminal block 440, a line 523, the terminal block 450 and the lines 474, 475. However, the line 482 is not energized at this time. The line 474 conducts current through the diode (unnumbered) associated therewith and the terminal block 450 over the line 436 to the blocking valve 410 shifting the same to its blocking position which delivers hydraulic fluid from the pump 405 over the line 437 through the control valve 411 into the line 477. However, since power does not flow over the line 482 the blocking valve 414 is not moved and remains in its blocking position preventing hydraulic fluid in the line 477 from passing through the blocking valve 414 and into the head end of the cylinder 121'. Accordingly, hydraulic fluid in the line 477 enters only into the head end of the cylinders 46' extending the pistons thereof and opening the dump door 44' with, of course, exhaust from the rod side flowing through the line 483, the control valve 411 and the line 446 back to the tank 401. Obviously, the dump door 44' is opened and the interior of the hopper 35' can now be inspected through the dump door opening.

In order to close the dump door 44' after inspection and/or servicing, the dump door contact arm 521 is moved to its upper dashed position in FIG. 19. Current flows through a line 531, the terminal block 440, a line 532 to the terminal block 450 and over lines 493, 494. The line 493 energizes the appropriate solenoid (unnumbered) of the control valve 411 to shift the valve to the left while the line 494 returns to the terminal block 450 through its associated diode (unnumbered) and delivers current through the line 436 to the blocking valve 410 moving the same to its blocking position. Once again, no power is delivered over the line 482. Accordingly, hydraulic fluid in the line 437 is delivered through the control valve 411 and through the line 483 into the rod end of the cylinders 46' causing the hopper dump door 44 to close. The same line 483 is in communication with the rod end of the cylinder 121', but the rod 122' is retracted and thus the hopper dump cylinder mechanism 120' remains in its retracted position. Hydraulic fluid is, of course, exhausted from the dump door cylinders 46' over the line 477, through the control valve 411 and over the exhaust line 446 to the tank 401.

Reference is now made to FIG. 20 of the drawings which illustrates a pneumatic and electric system 500 which can be associated with either of the sweepers 10, 10' and the respective control systems 70 (FIG. 14) and 400 (FIG. 19) thereof to effect automatic locking of the vehicle brake system incident to the performance of the dumping operation heretofore described. The automatic emergency braking system 500 is associated with a conventional vehicle braking system which includes a pump 501 which pressurizes air and delivers the same through a line 502 to a manual emergency brake valve 503 having an "OFF" side or position 504 and an "ON" side or position 505. When the manual emergency brake valve is in the "OFF" position 504, pressurized air is conducted through a line 506 into an "OFF" side or position 507 of an automatic emergency brake valve 510 having an "ON" side or position 508. Pressurized air exits the "OFF" side of the valve 510 through a line 511 and extends a rod 512 against the bias of a spring 513 of a truck brake cylinder 514. The rod 512 is connected to the "emergency" brake of the vehicle 10 or 10' and in the extended position of the rod 512 under the influence of the pressurized air keeps the vehicle "emergency" brake disengaged or "OFF." Obviously, the operator of the vehicle 10 or 10' can manually move the valve 503 prior to the beginning of the dumping sequence heretofore described to move the "ON" position of the manual brake valve 503 downwardly which brings a vent line 515 thereof in pneumatic communication with the line 506. This exhausts air from the cylinder 514 and the spring 513 shifts the rod 512 back into the cylinder 514 to the position illustrated in FIG. 20 to engage the vehicle "emergency" brake. However, it is obvious that if the brake valve 503 is not moved manually to its "ON" position, the vehicle "emergency" brake will not be engaged and with the vehicle transmission in neutral, which is a requirement of the system 400, the vehicle 10 or 10' could move during a dumping sequence with undesirable consequences.

In order to prevent dumping absent manual vehicle "emergency" brake engagement an automatic emergency brake limit switch 520 is provided and includes a contact arm 521. The limit switch 520 is located within the box beam portion 326 of either of the stabilizers 57' (FIGS. 15 and 16) such that the rod 58' of the stabilizer 57' holds the contact arm 521 in its phantom outline position when the rod 58' is fully retracted in its associated cylinder. When the blocking valve 412 (FIG. 19) of the system 400 is actuated in the manner heretofore described and the rods 58' begin moving outwardly of the associated cylinders 57', the contact arm 521 move to the solid line position illustrated in FIG. 20. Electrical current flows from the truck ignition switch (not shown) "RUN" position through a line 531 to a terminal block 532 and a line 533 to the limit switch contact 521 which is in its solid line position. Current flows through the contract 521, a line 534, the terminal block 532 and a line 535 to a solenoid (umnumbered) of the automatic emergency brake valve 510 which shifts the valve from its "OFF" position to its "ON" position bringing the line 511 in pneumatic communication with an exhaust line 509 of the valve 510. Pressure from the cylinder 514 exhausts through the line 511 and the line 509 which in turn allows the biasing force of the spring 513 to move the rod 512 to the left placing the emergency brake (not shown) of the vehicle in its engaged or "ON" position. Thus, even through the manual emergency brake valve 503 is not operated, the emergency brake of the vehicle 10 or 10' will be automatically engaged incident to the dumping operation and will continue engaged until after the dumping operation has been completed and the rods 58' have been retracted which in turn returns the contact 521 of the switch 520 to its phantom outline position reversing the operation just described.

Although a preferred embodiment of the invention has been specifically illustrated and described herein, it is to be understood that minor variations may be made in the apparatus without departing from the spirit and scope of the invention, as defined in the appended claims.

We claim:

1. A dump vehicle comprising a frame having a longitudinal axis, a hopper carried by said frame, a cab carried by said frame, means for moving said hopper substantially linearly from a first position substantially contiguous said frame to a second position substantially elevated and remote from said first position along a substantially linear longitudinal path of travel in a first direction and along the same substantially linear longitudinal path of travel in a second opposite direction for moving said hopper from said second position to said first position, said second position being generally above said cab, said moving means including first and second elongated substantially linearly extendable and retractable members, said elongated members each having a longitudinal axis, said elongated member longitudinal axes each being in substantial parallel relationship to said substantially linear longitudinal path of travel, means for connecting said hopper to said first member, means for connecting said second member to said frame, means for selectively extending and retracting said members relative to each other to respectively move said hopper from said first position to said second position and vice versa, a control arm, and means for coupling said control arm between one of said members and said frame thereby imparting a substantially arcuate component of movement to said hopper moving means during movement of said hopper moving means along said substantially linear longitudinal path of travel.

2. The dump vehicle as defined in claim 1 including means for guiding said hopper along a substantially arcuate path of travel to said second position.

3. The dump vehicle as defined in claim 1 wherein said control arm has a substantially fixed length.

4. The dump vehicle as defined in claim 1 including means operative when said hopper is in said second hopper position for blocking downward descent of said hopper from said second position.

5. The dump vehicle as defined in claim 1 wherein said selective extending and retracting means include first means for generating a first force of a predetermined relatively high magnitude to initiate movement of said hopper from said first position and second means for generating a second force of a lesser magnitude than said predetermined high magnitude during continued movement of said hopper to said second position.

6. The dump vehicle as defined in claim 1 including means for depositing material into said hopper while said hopper is in said first hopper position.

7. The dump vehicle as defined in claim 1 including means carried by said frame for engaging the ground when said hopper is in the second position thereof.

8. The dump vehicle as defined in claim 1 including means for removing debris from a surface, means for conveying the removed debris into the hopper when the hopper is in the first position thereof, said conveying means including a housing carried by said frame, said housing and hopper having a respective debris inlet and outlet, and said housing debris inlet and hopper debris outlet being in substantially registry with each other when said hopper is in the first position thereof.

9. The dump vehicle as defined in claim 1 including means for removing debris from a surface, means for conveying the removed debris into the hopper when the hopper is in the first position thereof, said conveying means including a housing carried by said frame, said housing and hopper having a respective debris inlet and outlet, said housing debris inlet and hopper debris outlet being in substantial registry with each other when said hopper is in the first position thereof, and means for forming a seal between said hopper debris outlet and said housing inlet when said hopper is in the first position thereof.

10. The dump vehicle as defined in claim 1 including a pick-up head disposed in generally transverse relationship to said frame longitudinal axis, an air inlet and an air outlet disposed in spaced relationship from each other along said pick-up head, means for introducing air into said air inlet and withdrawing air from said air outlet whereby air-entrained debris exits said air outlet, said hopper having an inlet and an outlet, a first conduit between said pick-up head outlet and said hopper inlet, a second conduit between said hopper outlet and said pick-up head inlet; said pick-up head, hopper and first and second conduits establishing a substantially continuous recirculating closed path of travel for air; and means for removing debris from the closed path of travel during the travel thereof between said pick-up head outlet and said pick-up head inlet.

11. The dump vehicle as defined in claim 1 wherein said coupling means includes a slidable connection.

12. The dump vehicle as defined in claim 1 wherein said coupling means includes an articulate connection.

13. The dump vehicle as defined in claim 1 wherein said coupling means includes a slidable connection and an articulate connection.

14. The dump vehicle as defined in claim 1 wherein said coupling means includes a slidable connection and a pivot connection.

15. The dump vehicle as defined in claim 1 wherein said coupling means includes a slidable connection between said control arm and one of said frame and said one member and an articulate connection between said control arm and the other of said frame and said one member.

16. The dump vehicle as defined in claim 1 wherein said coupling means includes a slidable connection between said control arm and one of said frame and said one member and a pivot connection between said control arm and the other of said frame and said one member.

17. The dump vehicle as defined in claim 15 wherein said slidable connection is between said control arm and said one member.

18. The dump vehicle as defined in claim 15 wherein said articulate connection is between said control arm and said frame.

19. The dump vehicle as defined in claim 15 wherein said slidable connection is between said control arm and said one member, said articulate connection is between said control arm and said frame, and said slidable connection includes a shoe in sliding relationship to said one member.

20. The dump vehicle as defined in claim 15 wherein said slidable connection is between said control arm and said one member, said articulate connection is between said control arm and said frame, said slidable connection includes a shoe in sliding relationship to said one member, and said coupling means includes another articulate connection between said shoe and said control arm.

21. The dump vehicle as defined in claim 15 wherein said slidable connection is between said control arm and said one member, said pivot connection is between said control arm and said frame, and said slidable connection includes a shoe in sliding relationship to said one member.

22. The dump vehicle as defined in claim 15 wherein said slidable connection is between said control arm and said one member, said pivot connection is between said control arm and said frame, said slidable connection includes a shoe in sliding relationship to said one member, and said coupling means includes another pivot connection between said shoe and said control arms.

23. The dump vehicle as defined in claim 15 wherein said slidable connection is between said control arm and said one member, said articulate connection is between said control arm and said frame, said slidable connection includes a shoe in sliding relationship to said one member, said frame carries a cab at a forward end portion of said frame, and said second position is generally above said cab.

24. A dump vehicle comprising a frame having a longitudinal axis, a cab and a hopper carried by said frame, means for moving said hopper substantially linearly from a first position substantially contiguous said frame to a second position substantially above said cab and remote from said first position along a substantially linear longitudinal path of travel in a first direction and along the same substantially linear longitudinal path of travel in a second opposite direction for moving said hopper from said second position above said cab to said first position, said moving means including a pair of first and second elongated substantially linearly extendable and retractable members positioned on substantially opposite sides of the frame longitudinal axis, said elongated members each having a longitudinal axis, said elongated member longitudinal axes each being in substantial parallel relationship to said substantially linear longitudinal path of travel, means for connecting said hopper to each of said first members, means for connecting each of said second members to said frame, means for selectively extending and retracting said members relative to each other to respectively move said hopper from said first position to said second position and vice versa, a pair of control arms, and means for coupling each control arm between one member of each of said pair of extendable and retractable members and said frame thereby imparting a substantially arcuate component of movement to said hopper moving means during movement of said hopper moving means along said substantially linear longitudinal path of travel.

25. The dump vehicle as defined in claim 24 wherein said hopper is disposed substantially between said pair of retractable members.

26. The dump vehicle as defined in claim 24 wherein each of said coupling means includes a slidable connection.

27. The dump vehicle as defined in claim 24 wherein each of said coupling means includes an articulate connection.

28. The dump vehicle as defined in claim 24 wherein each of said coupling means includes a slidable connection and an articulate connection.

29. The dump vehicle as defined in claim 24 wherein each of said coupling means includes a slidable connection and a pivot connection.

30. The dump vehicle as defined in claim 24 wherein each of said coupling means includes a slidable connection between its associated control arm and one of said frame and associated one member and an articulate connection between its associated control arm and the other of said frame and its associated one member.

31. The dump vehicle as defined in claim 24 wherein each of said coupling means includes a slidable connection between its associated control arm and one of said frame and associated one member and a pivot connection between its associated control arm and the other of said frame and its associated one member.

32. The dump vehicle as defined in claim 30 wherein each slidable connection is between its associated control arm and one member.

33. The dump vehicle as defined in claim 30 wherein each articulate connection is between its associated control arm and said frame.

34. The dump vehicle as defined in claim 30 wherein each slidable connection is between its associated control arm and one member, each articulate connection is between its associated control arm and frame. and each slidable connection includes a shoe in sliding relationship to its associated one member.

35. The dump vehicle as defined in claim 30 wherein each slidable connection is between its associated control arm and one member, each articulate connection is between its associated control arm and frame, each slidable connection includes a shoe in sliding relationship to its associated one member, and each coupling means includes another articulate connection between its associated shoe and control arm.

36. The dump vehicle as defined in claim 30 wherein each slidable connection is between its associated control arm and one member, each pivot connection is between its associated control arm and frame, and each slidable connection includes a shoe in sliding relationship to its associated one member.

37. The dump vehicle as defined in claim 30 wherein each slidable connection is between its associated control arm and one member, each pivot connection is between its associated control arm and frame. each slidable connection includes a shoe in sliding relationship to its associated one member, and each coupling means includes another pivot connection between its associated shoe and control arm.

38. The dump vehicle as defined in claim 30 wherein each slidable connection is between its associated control arm and one member, each articulate connection is between its associated control arm and frame, each slidable connection includes a shoe in sliding relationship to its associated one member, and said cab is at a forward end portion of said frame.

39. The dump vehicle as defined in claim 1 wherein said first and second extendable and retractable members are in telescopic relationship to each other.

40. The dump vehicle as defined in claim 24 wherein said first and second extendable and retractable members are in telescopic relationship to each other.

* * * * *